US006922509B2

(12) United States Patent
Hamada

(10) Patent No.: US 6,922,509 B2
(45) Date of Patent: Jul. 26, 2005

(54) OPTICAL DEVICE AND METHOD FOR MANUFACTURING THE SAME

(75) Inventor: Hidenobu Hamada, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 50 days.

(21) Appl. No.: 10/358,777

(22) Filed: Feb. 4, 2003

(65) Prior Publication Data

US 2003/0174961 A1 Sep. 18, 2003

(30) Foreign Application Priority Data

Mar. 18, 2002  (JP) .................................... 2002-074828
Aug. 23, 2002  (JP) .................................... 2002-244254

(51) Int. Cl.[7] ................................................. G02B 6/42
(52) U.S. Cl. ............................. 385/48; 385/39; 385/50
(58) Field of Search .......................... 385/39, 47, 48, 385/50

(56) References Cited

U.S. PATENT DOCUMENTS

| | | | |
|---|---|---|---|
| 6,188,819 B1 | 2/2001 | Kosaka et al. ................. | 385/39 |
| 6,853,760 B2 * | 2/2005 | Sekine et al. ................. | 385/14 |
| 2002/0021878 A1 | 2/2002 | Allan et al. | |
| 2002/0172456 A1 * | 11/2002 | Hosomi et al. ............... | 385/27 |
| 2003/0026570 A1 * | 2/2003 | Malsurra et al. ............ | 385/129 |
| 2003/0056546 A1 * | 3/2003 | Claus et al. .................. | 65/386 |

FOREIGN PATENT DOCUMENTS

| | | |
|---|---|---|
| JP | 11-271541 | 10/1999 |
| JP | 2001-13439 | 1/2001 |
| WO | WO 02/14913 | 2/2002 |

OTHER PUBLICATIONS

Joannopoulus et al., Photonic Crystals, Molding the Flow of Light, 1995, Princeton University Press, pp. 63–65.*
U.S. Appl. No. 60/322,730.*
Presby, H., et al., "Mechanical Silica Optical Circuit Switch", Electronics Letters, IEE Stevenage, GB, vol. 34, No. 5, Mar. 5, 1998, pp 484–485.
European Search Report, Dec. 21, 2004.
Hamada, H., "Photonic–Crystal Slabs with a Small Variation in Refractive Index and Application to optical Functional Devices" Technical Report of IEICE, OPE 2001–107 (Dec. 2001) vol. 101 No. 504 pp 19–24.

* cited by examiner

Primary Examiner—Mark A. Robinson
Assistant Examiner—Lee Fineman
(74) Attorney, Agent, or Firm—Hamre, Schumann Mueller & Larson, P.C.

(57) ABSTRACT

To provide an optical device and method for manufacturing the same that allow a reduction in size and the easy fabrication of an optical splitter or an optical coupler with which the branching ratio or the coupling ratio can be dynamically changed after device production. An optical device is provided with a photonic crystal having a periodic refractive index distribution due to a periodic arrangement of a plurality of materials of different refractive indices, an input-side optical waveguide for making light incident on the photonic crystal, and an output-side optical waveguide for emitting light from the photonic crystal, and further includes an external drive portion for changing a relative position of the photonic crystal and at least one of the input-side optical waveguide and the output-side optical waveguide, thereby allowing a small, high-performance optical device to be achieved.

23 Claims, 22 Drawing Sheets

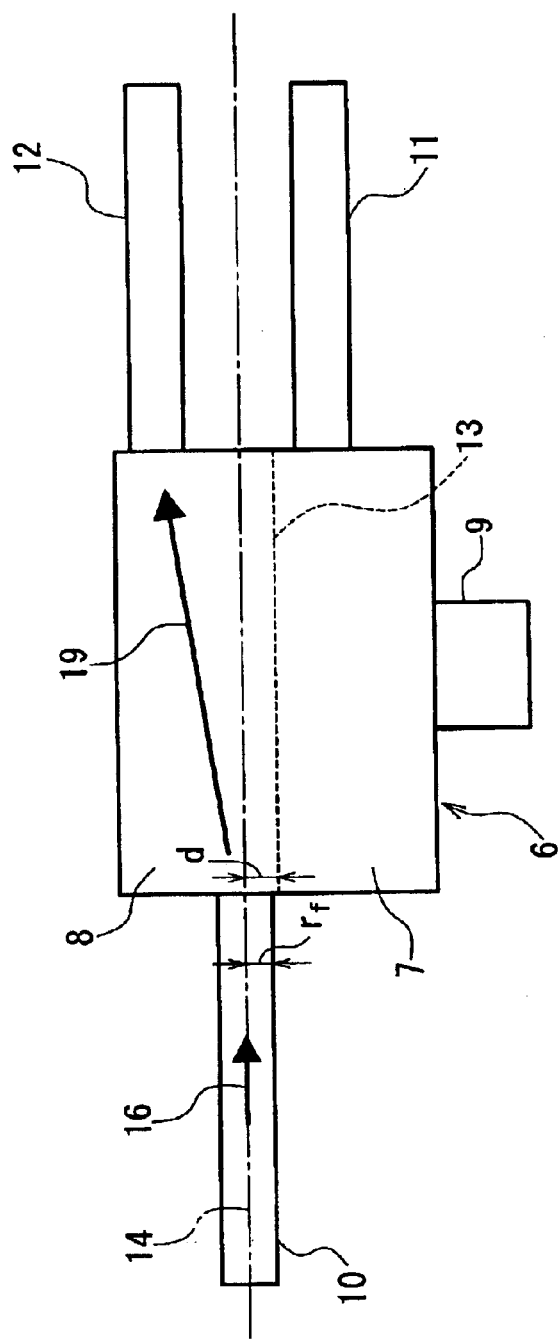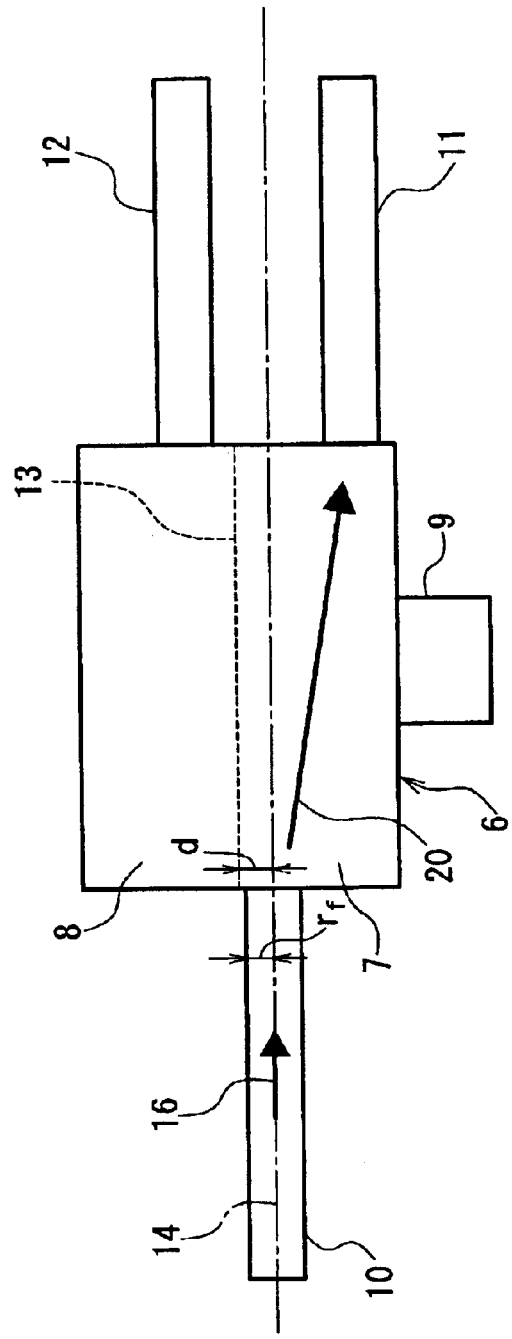
FIG. 6A
FIG. 6B

US 6,922,509 B2

OPTICAL DEVICE AND METHOD FOR MANUFACTURING THE SAME

FIELD OF THE INVENTION

The present invention relates to optical devices using photonic crystals and methods for manufacturing the same.

BACKGROUND OF THE INVENTION

An optical splitter, which is a conventional optical device that utilizes MMI (multi-mode interference) asymmetric Y-branching, is described with reference to FIG. 21. The optical splitter includes an input-side optical waveguide 120, an MMI device 121, and an output-side optical waveguide 122. The output-side optical waveguide 122 is branched into a first output portion 123 and a second output portion 124 into which light is guided. The branching characteristics of the optical splitter can be controlled using the spacing g between the first output portion 123 and the second output portion 124 of the output-side optical waveguide 122 at the emission end of the MMI device 121 and the change Δ in the width of the incident end of the MMI device 121.

Single-mode light that is transmitted over the input-side optical waveguide 120 is split into zero-order mode (single mode) and second-order mode (multimode) light by the MMI device 121. Moreover, the length h of the MMI device 121 has been optimized to adjust the difference in propagation speed of the zero-order and second-order mode light so that the antinode portions in the center of the zero-order and second-order mode light cancel each other out. This leaves only the antinode portions of the second-order mode light at the emission end of the MMI device 121, with a spacing between them of several μm, and this light is split up to an effective splitting distance (>100 μm) by the output-side optical waveguide 122. Here, if the MMI device 121 is symmetrical, that is, if the change Δ equals zero, then the optical splitter splits the light equally at a splitting ratio of 1:1. If the MMI device 121 is asymmetric (change Δ is greater than zero), then the quantity of light that is branched to the side where the MMI device 121 is smaller, that is, the side of the second output portion 124, is decreased, causing an increase in the quantity of light that is propagated through the first output portion 123 and a corresponding decrease in the quantity of light that is propagated through the second output portion 124. Thus, the branching ratio can be controlled by controlling the amount of the change Δ. FIG. 22 shows the relationship between transmission loss and the branching ratio with respect to the change Δ. It should be noted that the branching ratio is the output of the first output portion 123 divided by the output of the second output portion 124. As is clear from FIG. 22, the change Δ is altered within a range of 0 to 5 μm, and thus the branching ratio is in a range of 1 to 3 and the transmission loss at this time is near 0.2 dB.

A conventional optical coupler is described next using FIG. 23. A conventional optical coupler that uses a Y-branched waveguide includes a first input-side optical fiber 131, a second input-side optical fiber 132, a coupling portion 137, in which a Y-shaped core 134 is formed on a substrate 133, and an output-side optical fiber 136.

If incident light of the same phase is incident on the first input-side optical fiber 131 and the second input-side optical fiber 132, then these two incident light beams are coupled to the coupling portion 137 from the first input-side optical fiber 131 and the second input-side optical fiber 132, and are coupled into zero-order mode light along the shape of the core 134 and emitted from the output-side optical fiber 136. The intensity of the light emitted at this time is the sum of the intensity of the two incident light beams incident from the first input-side optical fiber 131 and the second input-side optical fiber 132, and the optical coupler properly functions as a coupler.

As mentioned above, the branching ratio of a conventional optical splitter is determined by the shape of the MMI device 121. Thus after an optical splitter has been fabricated, that is, after it has been processed into a device, the branching ratio cannot be changed dynamically if the need arises.

Also, the branching ratio can be altered to a ratio of at most 3:1. Moreover, a centimeter-order length is required to expand the splitting distance of several μm at the output end of the MMI 121 up to a practical splitting distance at the output-side optical waveguide 122. This leads to an unavoidable increase in loss at the output-side optical waveguide 122 and an increase in size when producing the device.

On the other hand, like the optical splitter, it is not possible to dynamically change the coupling ratio of the optical coupler. Also, the coupling angle is at most about 2°, like the branching angle, and thus the optical coupler cannot be made shorter, leading to a large device.

If light is incident on only one of either the first input-side optical fiber 131 or the second input-side optical fiber 132 of a conventional optical coupler, then the zero-order mode of the incident light excites a zero-order mode and a first-order mode at a Y-shaped joint 137 and the first-order mode light is radiated from the output side. This causes the problem of emission from the output-side optical fiber 136 at only half the intensity of the zero-order mode of the incident light.

Moreover, conventional optical splitters and optical couplers employ optical waveguides, which means a high-degree of optical alignment and mode-shape matching is necessary between optical fiber and the optical waveguides, and expertise is required for assembly.

SUMMARY OF THE INVENTION

The present invention was intended at to solve the foregoing problems, and it is an object thereof to provide an optical device and a method for manufacturing the same that permit a reduction in size and the easy fabrication of an optical splitter or an optical coupler, for example, with which the branching ratio or the coupling ratio can be dynamically changed after device production.

An optical device of the invention is provided with a photonic crystal having a periodic refractive index distribution due to a periodic arrangement of a plurality of materials of different refractive indices, an input-side optical waveguide for making light incident on the photonic crystal, an output-side optical waveguide for emitting light from the photonic crystal, and an external drive portion for changing the relative position of the photonic crystal and at least one of the input-side optical waveguide and the output-side optical waveguide. Thus, it is possible to achieve an optical device with low-loss and moreover with which the branching ratio or the coupling ratio can be changed dynamically without requiring the use of an optical waveguide that requires high-precision for fabrication.

Also, it is also possible for the photonic crystal to be a composite photonic crystal in which two photonic crystals having refractive index distributions of different periods are joined at a junction face.

Also, it is preferable that the photonic crystal has a two-dimensional or a three-dimensional lattice structure in which a plurality of materials with different refractive indices are arranged periodically, and a two-dimensional lattice structure composed of a group of primitive lattice vectors has a lattice structure having no rotation axis of more than three-fold. Thus, light of a specific wavelength is diverted when incident on the photonic crystal in the direction of a primitive lattice vector of the photonic crystal (deflection dispersion characteristics), so that an optical device such as an optical coupler or an optical splitter or the like with which smaller sizes can be achieved can be fabricated.

Also, it is preferable that the photonic crystal is provided with a background material and a rod-shaped material of different refractive indices and has a two-dimensional lattice structure in which a plurality of units of the rod-shaped material are arranged periodically in the background material so that their axes are parallel, and that the acute angles between the primitive lattice vectors of the photonic crystal are greater than 60° but smaller than 90°. Thus, the photonic crystal has a two-dimensional structure and exhibits deflection dispersion characteristics, and therefore an optical device such as an optical coupler or an optical splitter with which smaller sizes are possible can be easily fabricated.

Also, it is preferable that a lattice constant of the photonic crystal is 0.4 to 0.6 times a length of a wavelength of a specific light diverted within the photonic crystal. Thus, the specific light that is propagated by the photonic crystal is diverted.

It is also possible that a cross section shape of the rod-shaped material is circular, and that the length of a radius of the circular shape is 0.08 to 0.3 times the wavelength of the specific light that is diverted.

It is further preferable that the optical device also includes a monitor portion for monitoring a light amount propagated through the output-side optical waveguide and converting this amount into a signal, and a calculation control portion for receiving the signal indicating the light amount from the monitor portion and carrying out calculations based on the light amount to control the external drive portion so that the light amount propagated through the output-side optical waveguide becomes a desired value. Thus, an optical device with which the coupling ratio or the branching ratio can be held at a constant value is achieved.

It is further preferable that the respective directions of at least one primitive lattice vector of each of the two different photonic crystals with respect to the junction face are identical and are parallel to the junction face of the photonic crystal, and that a direction of an optical axis of the input-side optical waveguide is identical to the direction of the at least one primitive lattice vector. Thus, an optical device such as an optical splitter or an optical coupler with a large branching angle or coupling angle can be achieved, allowing the optical device to be reduced in size.

Also, it is possible that of the primitive lattice vectors of each photonic crystal, the primitive lattice vectors that are not parallel to the junction face are symmetrical with respect to the junction face.

It is further preferable that there is one input-side optical waveguide and two output-side optical waveguides, that the input-side optical waveguide is arranged at an end face of the composite photonic crystal so that its optical axis is near the junction face of the composite photonic crystal, that the output-side optical waveguides are arranged at a face of the composite photonic crystal on the side opposite that on which the input-side optical waveguide is arranged, and are positioned symmetrically to one another with respect to the junction face, and that due to a shift amount between the junction face and the optical axis of the input-side optical waveguide generated by the external drive portion, light that is incident from the input-side optical waveguide can be branched to a desired branching ratio and emitted to each output-side optical waveguide. Thus, the branching angle can be changed dynamically, allowing an optical splitter with a large branching angle to be achieved.

It is also possible that the external drive portion is capable of shifting the composite photonic crystal or the input-side optical waveguide perpendicularly to the junction face.

Further, it is preferable that the optical device further includes a monitor portion for monitoring the light amount propagated through each output-side optical waveguide and converting this amount into a signal, and a calculation control portion for receiving the signal indicating the light amount from the monitor portion, comparing by calculation this with the desired branching ratio at which light is to be propagated by each output-side optical waveguide, and controlling the external drive portion so that the amount of light propagated through each output-side optical waveguide becomes the desired branching ratio. Thus, feedback controls are used to achieve very precise controls, and an optical splitter with which the desired branching ratio can be maintained can be achieved.

It is further preferable that there are two input-side optical waveguides and one output-side optical waveguide, that the output-side optical waveguide is arranged at an end face of the composite photonic crystal so that its optical axis is near the junction face of the composite photonic crystal, that the input-side optical waveguides are arranged at a face of the composite photonic crystal on the side opposite that on which the input-side optical waveguide is arranged, and are positioned symmetrically to one another with respect to the junction face, and that due to a shift amount between the junction face and the optical axis of the output-side optical waveguide, light that is incident from each input-side optical waveguide can be coupled at desired coupling ratios and emitted to the output-side optical waveguide. Thus, the coupling angle can be changed dynamically, and an optical coupler with a larger coupling ratio can be achieved.

It is also possible that the external drive portion is made capable of shifting the composite photonic crystal or the output-side optical waveguide perpendicularly with respect to the junction face.

It is further preferable that the optical device also includes a monitor portion for monitoring a light amount propagated through the output-side optical waveguide and converting this amount into a signal, and a calculation control portion for receiving the signal indicating the light amount from the monitor portion, comparing by calculation the light amount that is propagated through the output-side optical waveguide and the light amount according to the desired coupling ratio, and controlling the external drive portion so that the amount of light propagated through the output-side optical waveguide assumes the desired value. Thus, feedback controls are used to achieve very precise controls, and an optical coupler that allows a desired coupling ratio to be maintained can be achieved.

It is further preferable that the input-side optical waveguide can be employed as the output side and the output-side optical waveguide can be employed as the input side, and that the external drive portion detects the input and output directions of the light and controls a shift amount between the junction face and the optical axis of the input-side optical waveguide or the output-side optical waveguide so that it becomes an optimal amount. Thus, a single optical device can be employed as both a splitter and a coupler.

It is also preferable that there are two input-side optical waveguides and one output-side optical waveguide, that the input-side optical waveguides are arranged at an end face of the photonic crystal so that their respective optical axes are parallel to a direction of one of the primitive lattice vectors of the photonic crystal, that the output-side optical waveguide is arranged at a face of the photonic crystal on the side opposite that on which the input-side optical waveguides are arranged, so that its optical axis is identical to that of either one of the input-side optical waveguides, and that the external drive portion shifts the input-side optical waveguide with the optical axis that is different from the optical axis of the output-side optical waveguide perpendicularly with respect to the optical axis of the output-side optical waveguide. Thus, a gain-variable Add device (gain-variable optical multiplexer) that multiplexes by dynamically changing the amount of input light can be achieved with a simple configuration.

It is further preferable that a distance between the input-side optical wave guides is substantially proportional to a length of the photonic crystal in a progress direction of light in the photonic crystal. Thus, if one of the light beams incident from the input-side optical waveguides progresses in a straight line and the other is diverted, then they are coupled at the end face of the photonic crystals and propagated through the output-side optical waveguide.

It is also possible that a plurality of light beams are propagated through the input-side optical waveguide that has an optical axis identical to the optical axis of the output-side optical waveguide, and that only a specific light diverted inside the photonic crystal is propagated into the other input-side optical waveguide. It is further preferable that the optical device also includes a monitor portion for monitoring a light amount propagated through the output-side optical waveguide and converting this amount into a signal, and a calculation control portion for receiving the signal indicating the light amount from the monitor portion, performing a calculation based on a desired light coupling ratio and the light amount, comparing by calculation the light amount that is propagated through the output-side optical waveguide and the light amount according to the desired coupling ratio, and controlling the external drive portion so that the amount of light propagated through the output-side optical waveguide becomes the desired value. Thus, using feedback controls, very precise controls can be performed and the desired coupling ratio can be maintained.

It is also possible that there are two input-side optical waveguides and one output-side optical waveguide, that the input-side optical waveguides are arranged at an end face of the photonic crystal so that their respective optical axes are parallel to a direction of one of the primitive lattice vectors of the photonic crystal, that the output-side optical waveguide is arranged at a face of the photonic crystal on the side opposite that on which the input-side optical waveguides are arranged, so that its optical axis is parallel to and near that of either one of the input-side optical waveguides, and that the external drive portion shifts the input-side optical waveguide having an optical axis arranged near the optical axis of the output-side optical waveguide perpendicularly to the optical axis of the output-side optical waveguide.

It is also possible that a distance between the input-side optical wave guides is substantially proportional to a length of the photonic crystal in a progress direction of light in the photonic crystal.

In addition, it is possible that a plurality of light beams are propagated through the input-side optical waveguide with the optical axis near the optical axis of the output-side optical waveguide, and that only a specific light that is diverted inside the photonic crystal is propagated into the other input-side optical waveguide.

It is possible to also provide a monitor portion for monitoring a light amount propagated through the output-side optical waveguide and converting this amount into a signal, and a calculation control portion for receiving the signal indicating the light amount from the monitor portion, performing a calculation based on a desired light coupling ratio and the light amount, comparing by calculation the light amount that is propagated through the output-side optical waveguide and the light amount according to the desired coupling ratio, and controlling the external drive portion so that the amount of light propagated through the output-side optical waveguide becomes the desired value.

A further optical device of the invention includes a photonic crystal having a periodic refractive index distribution due to a periodic arrangement of a plurality of materials of different refractive indices, an input-side optical waveguide for making light incident on the photonic crystal, and an output-side optical waveguide for emitting light from the photonic crystal. In this optical device, the photonic crystal is a composite photonic crystal in which two photonic crystals having refractive index distributions of different periods are joined at a junction face, the composite photonic crystal includes a background material and a rod-shaped material of different refractive indices and has a two-dimensional lattice structure in which a plurality of units of the rod-shaped material are arranged periodically in the background material so that their axes are parallel, and one primitive lattice vector of each photonic crystal are parallel to one another and to the junction face, angles between the primitive lattice vectors of each photonic crystal are identical, and acute angles of these angles are greater than 60° but smaller than 90°, the lattice constant of the photonic crystals are different, and the input-side optical waveguide is arranged at a face of the photonic crystal so that its optical axis is included in the junction face. Thus, an optical splitter can be achieved.

It is also possible that the rod-shaped materials of each photonic crystal are materials of the same type, and that the rod-shaped materials of each photonic crystal are both arranged on the junction face.

A yet further optical device of the invention includes a background material and a rod-shaped material of different refractive indices, and has a two-dimensional lattice structure in which a plurality of units of the rod-shaped material are arranged periodically in the background material so that their axes are parallel. In this optical device, a refractive index distribution of the background material and the rod-shaped material, or a refractive index distribution of only the background material, has a maximum point in the axial direction of the rod-shaped material of the photonic crystal, and in the refractive index distribution of the background material and the rod-shaped material, or in the refractive index distribution of only the background material, in the axial direction of the rod-shaped material of the photonic crystal, the refractive index decreases when approaching end portions of the photonic crystal. Thus, the effects of trapping light in the composite crystal are increased, and loss is reduced.

It is preferable that the refractive index distribution of the background material and the rod-shaped material is asymmetrical in the direction toward the end portions from the maximum point. Thus, the distribution of light in the thickness direction of the photonic crystal can be adjusted.

It is also possible that the photonic crystal has a substrate on either one of its end faces in the axial direction of the rod-shaped material, and that a ratio of the decrease of the refractive indices of the background material and the rod-shaped material in the direction of the end faces of the photonic crystal from the maximum point is higher on the side with the substrate.

It is further preferable that the maximum point is not located at the center in the thickness direction of the photonic crystal. Thus, the spot to which light is focused in the thickness direction of the photonic crystal can be adjusted.

It is further preferable that the rod-shaped material is air. Thus, the refractive indices of the units of the rod-shaped material are constant.

It is also possible that the photonic crystal has a substrate on either of its end faces in the axial direction of the rod-shaped material, and that a refractive index of the substrate is lower than the refractive index of the background material and is lower than or equal to that of the rod-shaped material.

It is further preferable that the rod-shaped material of the photonic crystal is air and has been provided as holes in the background material, and the rod-shaped holes of a same shape and arrangement as the holes for the rod-shaped material extend into the substrate but do not pass through the substrate. Thus, the effects of trapping light within the photonic crystal are increased.

A yet further optical device of the invention is provided with a photonic crystal having a two-dimensional structure in which a plurality of rod-shaped holes are provided in a background material and the holes are periodically arranged in the background material so that the axes of the plurality of holes are parallel, and a substrate that is closely adhered to the photonic crystal. The substrate is provided with a groove in its face that is in contact with the photonic crystal. Thus, the area of contact between the substrate, which has a high refractive index, and the photonic crystal is reduced, and thus the effects of trapping light are increased.

It is further preferable that the groove is a V-groove for fastening an optical fiber. Thus, an optical fiber can be fastened, and an optical device with which alignment of the optical fiber is easy can be produced.

It is further preferable that the optical device further includes a sealed container, into which a filler material that is a liquid or a gas has been filled, in which the photonic crystal and the optical device substrate are placed still formed as a single unit and the groove and the holes are filled by the filler material. Thus, by providing a filler material that has a low refractive index, the refractive index around the photonic crystal is reduced, which increases the effects of trapping light.

A method for manufacturing an optical device of the invention is directed to producing a photonic crystal provided with a background material and a rod-shaped material with different refractive indices and having a two-dimensional lattice structure in which the rod-shaped material is periodically arranged in the background material so that axes of a plurality of units of the rod-shaped material are parallel. The manufacturing method includes forming the background material on a fabrication substrate, fabricating the photonic crystal by forming holes in the background material where the periodically arranged rod-shaped material is arranged, and forming an optical device substrate on the side of the background material that is opposite that on which the fabrication substrate has been formed. Thus, the photonic crystal can be easily turned into a device, allowing an optical device provided with the optical photonic crystal to be fabricated easily.

BRIEF DESCRIPTION OF THE DRAWINGS

FIGS. 6a–b are plan views describing the optical device according to the fourth embodiment of the invention.

DESCRIPTION OF THE PREFERRED EMBODIMENTS

First Embodiment

Figure 1:
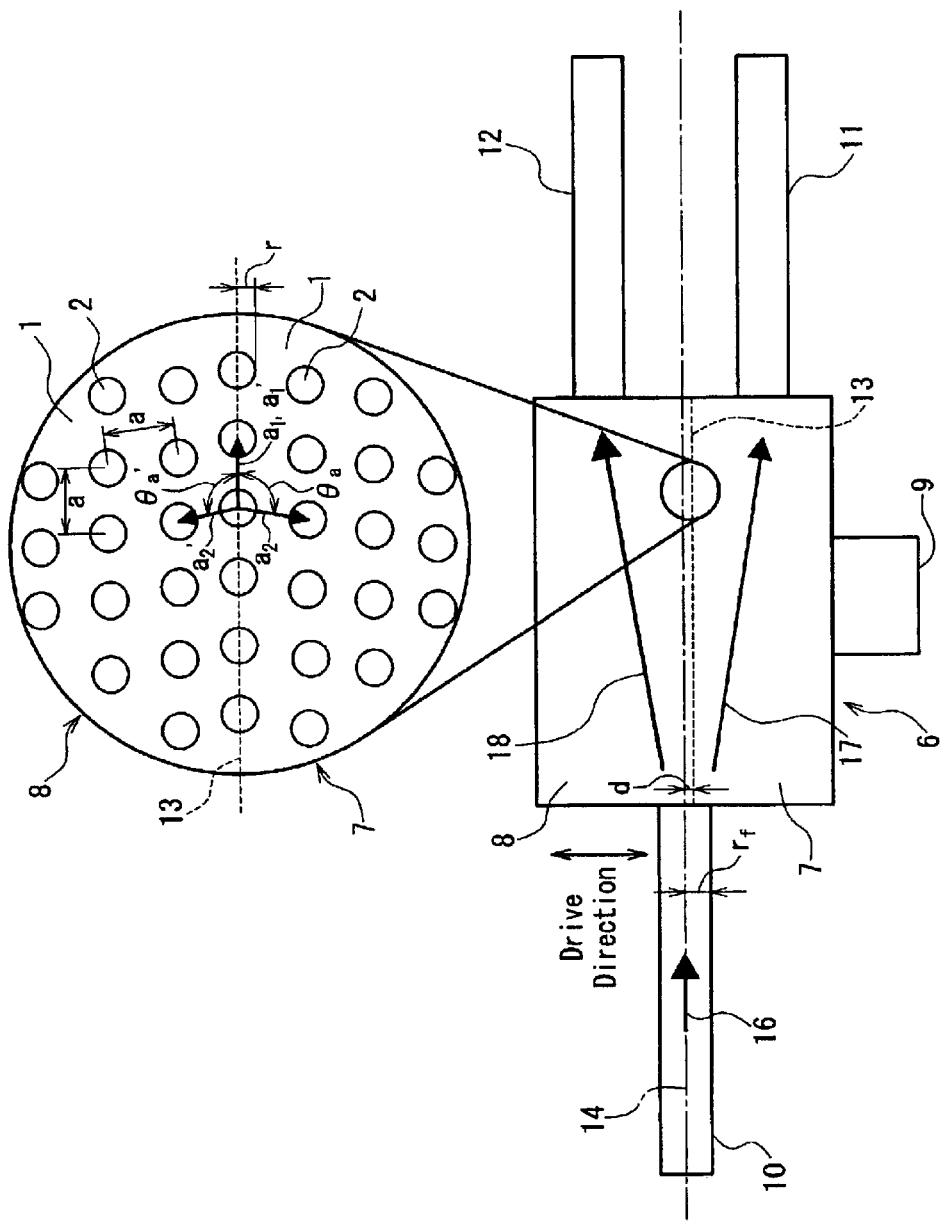
FIG. 1 is a plan view showing the configuration of the optical device of the first embodiment of the invention.

An optical device according to a first embodiment of the invention is described with reference to FIG. 1. An optical device according to the first embodiment is a branching ratio-variable optical splitter, and as shown in FIG. 1, includes a composite photonic crystal 6 on one end of which an input-side optical fiber 10 is arranged and on the other end of which a first output-side optical fiber 11 and a second output-side optical fiber 12 are arranged. Also, the composite photonic crystal 6 is provided with a drive portion 9, which may drive the composite photonic crystal 6 perpendicularly to an optical axis 14 of the input-side optical fiber 10.

The composite photonic crystal 6 is made by joining a first photonic crystal 7 and a second photonic crystal 8 at a junction face 13.

A photonic crystal is an artificial, multidimensional periodic structure having a refractive index that is periodic with a period in the same order as the wavelength of light. Changing the periodicity of a photonic crystal allows desired optical characteristics to be achieved.

The first photonic crystal 7 and the second photonic crystal 8 are photonic crystals with two-dimensional structures in which cylindrical rod-shaped materials 2 are arranged periodically in a background material 1. The center axes of each rod-shaped material 2 are arranged parallel to one another. The background material 1 and the rod-shaped material 2 in the first photonic crystal 7 and the second photonic crystal 8 may be the same materials. The lattice structures of the first photonic crystal 7 and the second photonic crystal 8 may be mirror-symmetrical about the junction face 13.

Using the primitive lattice vectors ($a_1$, $a_2$) of the first photonic crystal 7 and the primitive lattice vectors ($a_1'$, $a_2'$) of the second photonic crystal 8, an example of specific lattice structures of the first photonic crystal 7 and the second photonic crystal 8 is described. The first primitive lattice vectors $a_1$ and $a_1'$ of the first photonic crystal 7 and the second photonic crystal 8 are parallel to the junction face 13 of the composite photonic crystal 6, and the second primitive lattice vector $a_2$ of the first photonic crystal 7 and the second primitive lattice vector $a_2'$ of the second photonic crystal 8 are symmetrical with respect to the junction face 13.

Both the first photonic crystal 7 and the second photonic crystal 8 have oblique lattice structures with poor symmetry and are symmetrical about the junction face 13, so that the angle formed by the primitive lattice vector al and the primitive lattice vector $a_2$ and the angle formed by the primitive lattice vector $a_1'$ and the primitive lattice vector $a_2'$ are equal. Of these angles, the acute angles $(180-\theta_a)°$, $(180-\theta_a')°$ are greater than 60° but smaller than 90°.

The lattice constant a, which is the distance between the rod-shaped materials 2, is between 0.4 and 0.6 times the wavelength of the incident light, and the radius r of the rod-shaped materials 2 in the first and the second photonic crystals 7 and 8 is between 0.08 and 0.3 times the wavelength of the incident light. Here, incident light refers to specific light that is diverted in the photonic crystal. It should be noted that the two-dimensional photonic crystal structure can be achieved by providing holes in a background material 1 made of a polymer or glass, for example. Thus, a two-dimensional photonic crystal in which the rod-shaped material 2 is air can be achieved. In another configuration, a rod-shape material 2 made of a polymer or glass, for example, having a refractive index of about 1.5 can be distributed throughout a background material 1 made of Si, GaAs, or $Ti_2O_5$, for example, having a refractive index of about 3. Examples of a polymer material include acrylic-based polymers (PMMA, UV acrylate polymers, etc.), epoxy-based polymers, polyimide-based polymers, silicon-based polymers, and carbonate-based polymers (polycarbonate).

The refractive indices of the background material 1 and the rod-shape material 2 are the important point in determining the properties of the photonic crystal. Thus as long as materials that fulfill the above-mentioned refractive index conditions are used, a desired photonic crystal can be fabricated using materials other than those mentioned above, including solids (for example, dielectrics such as oxides), liquids (for example, water or ethylene glycol), and gases (for example, air and inert gases).

It should be noted that the composite photonic crystal 6 can be provided with a substrate or a cladding layer, the refractive index of which should be lower than that of the background material 1 and equal to or lower than that of the rod-shaped material 2, for example.

The optical axis 14 of the input-side optical fiber 10 may be identical in direction to the primitive lattice vectors $a_1$, $a_1'$ of the first photonic crystal 7 and the second photonic crystal 8, and is arranged near the junction face 13. The first output-side optical fiber 11 is arranged at an end face of the first photonic crystal 7 and the second output-side optical fiber 12 is arranged at an end face of the second photonic crystal 8.

Incidentally, the specific light mentioned above that is incident in the direction of the primitive lattice vector on a photonic crystal with a lattice structure that has poor symmetry is known to be diverted within the photonic crystal (see Technical Report of IECIE.OPE 2001-107 (2001-12) "Photonic-Crystal Slabs with a Small Variation in Refractive Index and Application to Optical Functional Devices"). In the case of a two-dimensional crystal lattice, a lattice structure with poor symmetry is a photonic crystal that has acute angles between primitive lattice vectors that are greater than 60° but smaller than 90°, such as the first photonic crystal 7 and the second photonic crystal 8 mentioned above. It is known that such photonic crystals have strong wavelength dispersion characteristics and that incident light is diverted by about 10°, although this depends on the wavelength.

It should be noted that if the photonic crystal has a two-dimensional lattice structure made of a group of primitive lattice vectors that has no rotation axis of more than three-fold, then it has deflection dispersion characteristics, whether it is a two-dimensional lattice structure or a three-dimensional lattice structure. Thus such a photonic crystal can be used similarly to form an optical device.

If a specific light beam at the specific wavelength is incident on the first photonic crystal 7 in the direction of the primitive lattice vector $a_1$, then that light beam is diverted in the direction denoted by a progress direction 17, and similarly, if a light beam of the specific wavelength is incident on the second photonic crystal, then that light beam is diverted in the direction denoted by a progress direction 18. The first photonic crystal 7 and the second photonic crystal 8 are fabricated by adjusting the structure of their photonic crystals so that each obtains the desirable properties mentioned above.

With the composite photonic crystal 6, the first photonic crystal 7 and the second photonic crystal 8 are joined at the junction face 13, and thus by causing a light beam of the specific wavelength to be incident on the junction face 13 by the input-side optical fiber 10, half of this light beam is incident on the first photonic crystal 7 side and half is incident on the second photonic crystal 8 side, splitting an incident light beam 16 in the progress directions 17 and 18. These two beams are propagated through the composite photonic crystal 6 and emitted from its end face. Thus, an optical splitter is achieved, and because the light beam is diverted by about 10° in the photonic crystal, the branching angle is about 20°. That is, even if the length of the optical splitter is about several hundred μm, the splitting distance is at least ten times that of a conventional optical splitter. Consequently, a smaller optical splitter than conventional optical splitters can be obtained.

The first output-side optical fiber 11 is arranged at the spot where the light beam that is propagated through the first photonic crystal 7 is emitted. The second output-side optical fiber 12 is arranged at the spot where the light beam that is propagated through the second photonic crystal 8 is emitted.

The incident light beam is split equally if the optical axis 14 of the input-side optical fiber 10 is located on the junction face 13, but as shown in FIG. 1, if the optical axis 14 and the junction face 13 are misaligned, then the branching ratio of the light beam is changed depending on the extent of the distance between them. That is, if the optical axis 14 is positioned more on the second photonic crystal 8 side than on the junction face 13, then the output of the second output-side optical fiber 12 becomes larger than that of the first output-side optical fiber 11.

The optical device according to the first embodiment is provided with an external drive portion 9 for driving the composite photonic crystal 6 relative, e.g. perpendicularly, to the junction face 13. The external drive portion 9 is used to drive the compound optical fiber 6 and shift the optical axis 14 off of the junction face 13, allowing the branching ratio of the light beam to be controlled. The branching ratio is determined by the partial ratio of the incident light that is incident on the first photonic crystal 7 side and on the second photonic crystal 8 side. Consequently, the distance d between the optical axis 14 and the junction face 13, which corresponds to the amount that the composite photonic crystal 6 is shifted, does not have to be more than the core radius $r_f$ (for example, approximately 4 μm) of the input-side optical fiber 10. Thus it is sufficient for the external drive portion 9 to have a drive region of only the core radius $r_f$ and to be able to drive within that range. The external drive portion 9 can be achieved using a MEMS (micro electro mechanical sysytems), a piezoelectric element, or a motor (such as a step motor or an ultrasound motor), for example.

Thus, by controlling the relative positions of the junction face 13 of the composite photonic crystal 6 and the optical axis 14 of the incident-side fiber 10 using the external drive portion 9, it is possible to control the ratio of the component that is incident on the first photonic crystal 7 side and the component that is incident on the second photonic crystal 8 side. Consequently, the incident light can be branched at a branching angle of about 20°, and moreover the branching ratio can be changed dynamically.

Figure 2A:
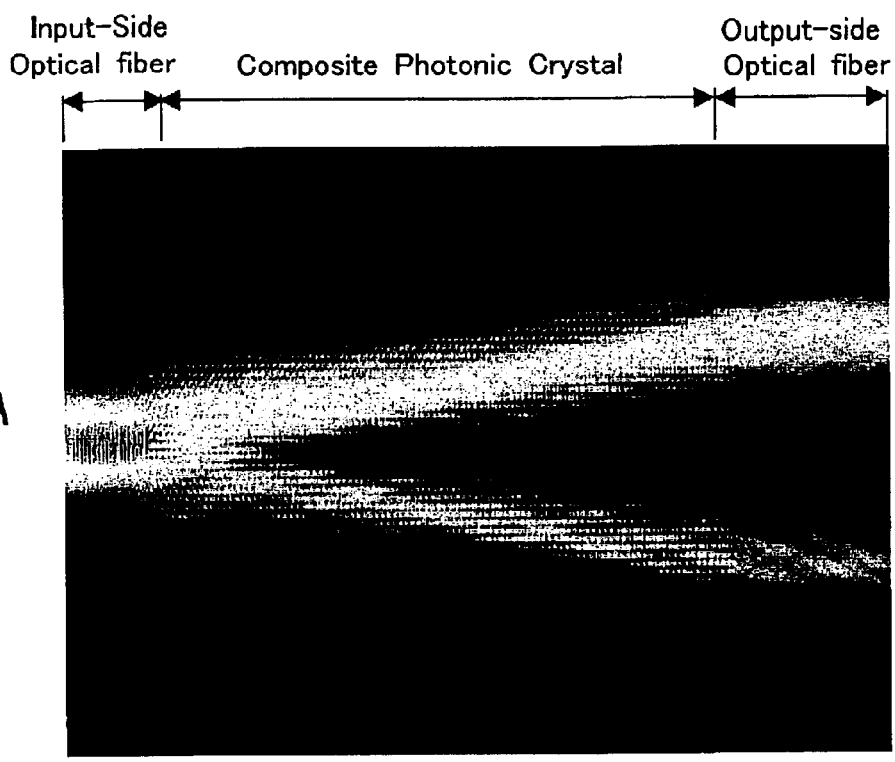
FIGS. 2a–b are diagrams showing the results of a measurement of the optical device according to the first embodiment of the invention.
Figure 2B:
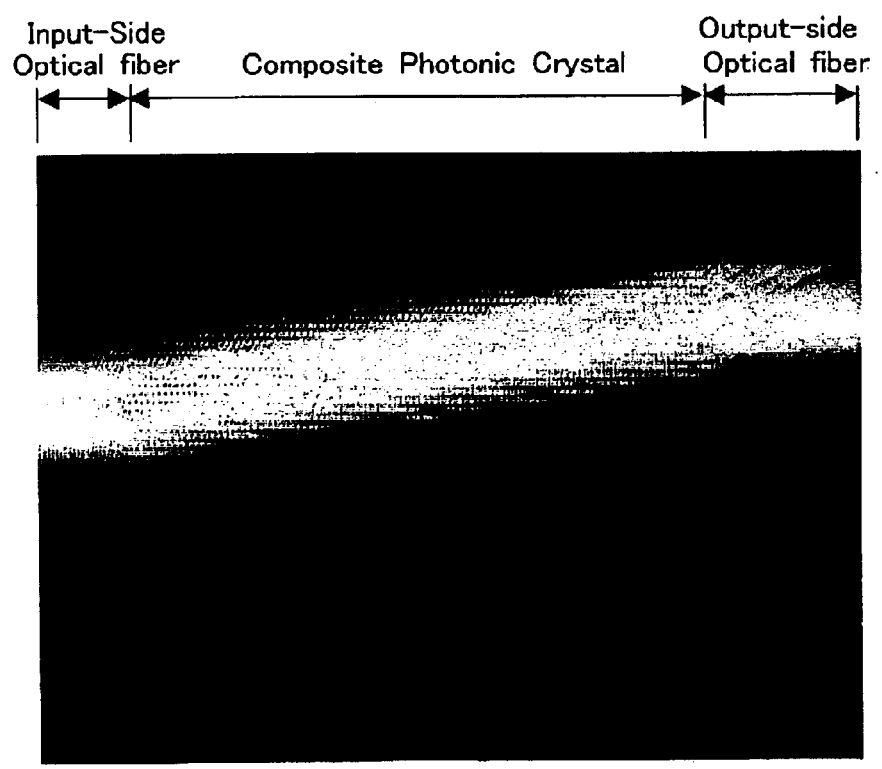

FIG. 2 shows the results of a simulation of the optical device according to the first embodiment. In this example, the optical axis 14 has been shifted toward the second output-side optical fiber 12. FIG. 2A illustrates a case where the relationship between the shifted amount d of the composite photonic crystal 6 and the core radius $r_f$ of the input-side optical fiber 10 is $d/r_f=0.5$. It is clear from FIG. 2A that the light beam that is propagated in a straight line from the input-side optical fiber on the left is branched inside the composite photonic crystal and is once again propagated in a straight line by the output-side optical fibers at the top and bottom on the right side of the figure. Also, it is clear that the second output-side optical fiber on top has a higher output than the one below. On the other hand, FIG. 2B shows a case where $d/r_f=1.0$. It is clear that a light beam propagated in a straight line from the input-side optical fiber on the left is diverted upward in the composite photonic crystal and then propagated in a straight line through the second output-side optical fiber on the right. It is also clear that light is not propagated into the first output-side optical fiber at the bottom.

Furthermore, in contrast to the branching ratio of a conventional branching ratio-variable optical splitter, which is at most about three, the branching ratio-variable optical splitter according to the first embodiment is capable of a branching ratio of three or more while maintaining a transmission loss that is on par with conventional branching ratio-variable optical splitters.

Also, although the first photonic crystal 7 and the second photonic crystal 8 have different lattice structures, they are symmetrical about the junction face 13, so that by rotating the first photonic crystal 7 its lattice structure can be made identical to that of the second photonic crystal 8, for example. Consequently, the first photonic crystal 7 and the second photonic crystal 8 can be achieved using a single type of photonic crystal, allowing time and effort for creating the photonic crystals to be obviated. Also, the optical splitter can be adopted for any system having different branching ratios and the branching ratio can be changed dynamically within the same system if necessary, so that with a simple configuration it is possible to achieve a dynamic branching ratio-variable optical splitter, which has been extremely difficult to achieve with conventional branching ratio-variable optical splitters employing MMI.

It should be noted that in the above description the photonic crystal had a two-dimensional structure, but it is also possible to use a photonic crystal that has a three-dimensional structure.

Second Embodiment

Figure 3:
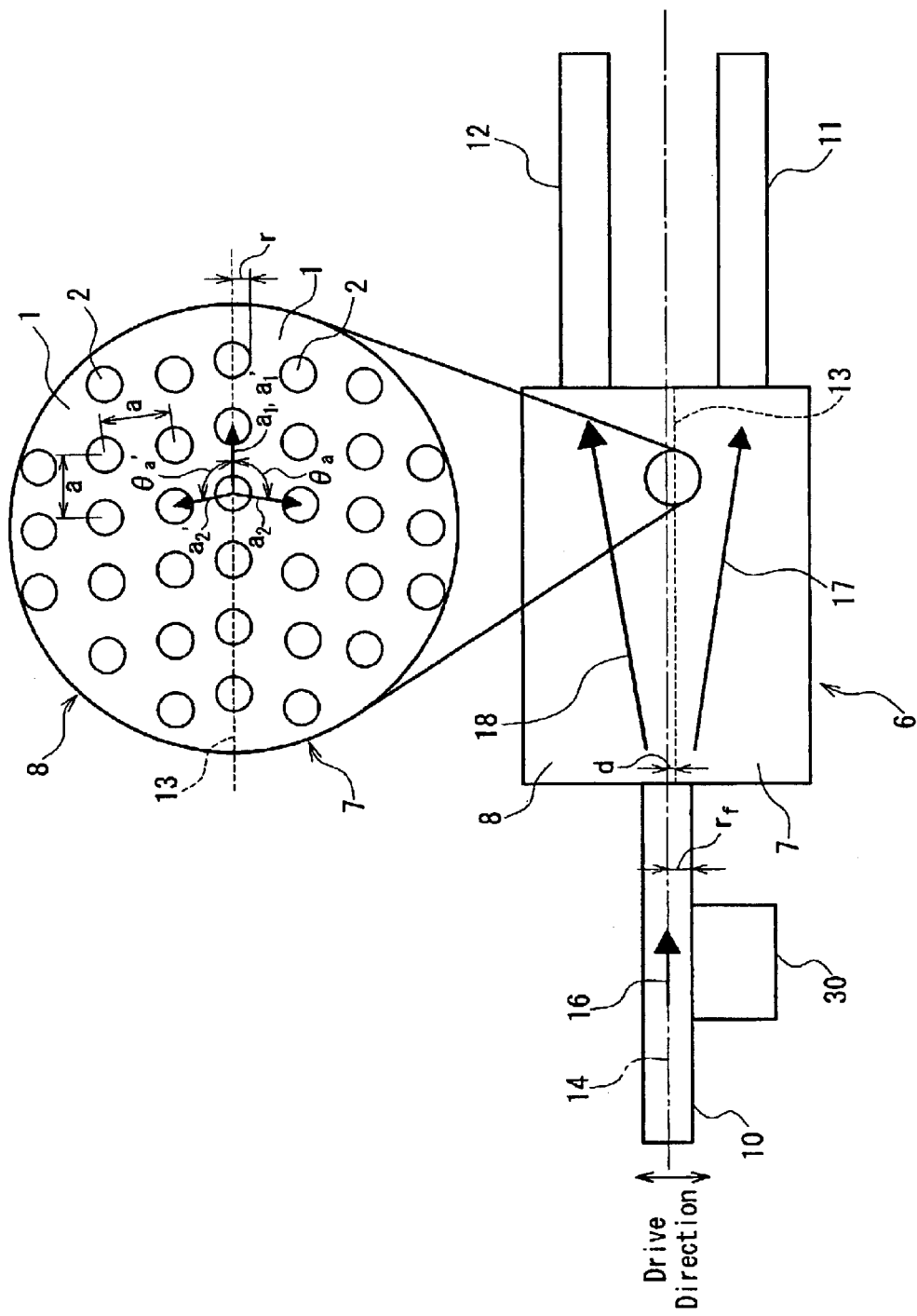
FIG. 3 is a plan view showing the configuration of the optical device of the second embodiment of the invention.

An optical device according to a second embodiment of the invention is described using FIG. 3. The optical device of the second embodiment is identical to the optical device of the first embodiment except that an external drive portion 30 for shifting the input-side optical fiber 10 perpendicularly to the optical axis 14 has been provided in place of the external drive portion 9 for shifting the composite photonic crystal 6.

With the optical device according to the second embodiment, the input-side optical fiber 10 is shifted by the external drive portion 30, adjusting the distance between the optical axis 14 and the junction face 13 so as to control the branching ratio of the light. The branching ratio is determined by the partial ratio of the incident light that is incident on the first photonic crystal 7 side and on the second photonic crystal 8 side. As in the first embodiment, the length of the core radius $r_f$ is sufficient for the distance d between the junction face 13 of the composite photonic crystal 6 and the optical axis 14, and the external drive portion 41 can be achieved using a MEMS, a piezoelectric element, or a motor (such as a step motor or ultrasound motor), for example.

Figure 4:
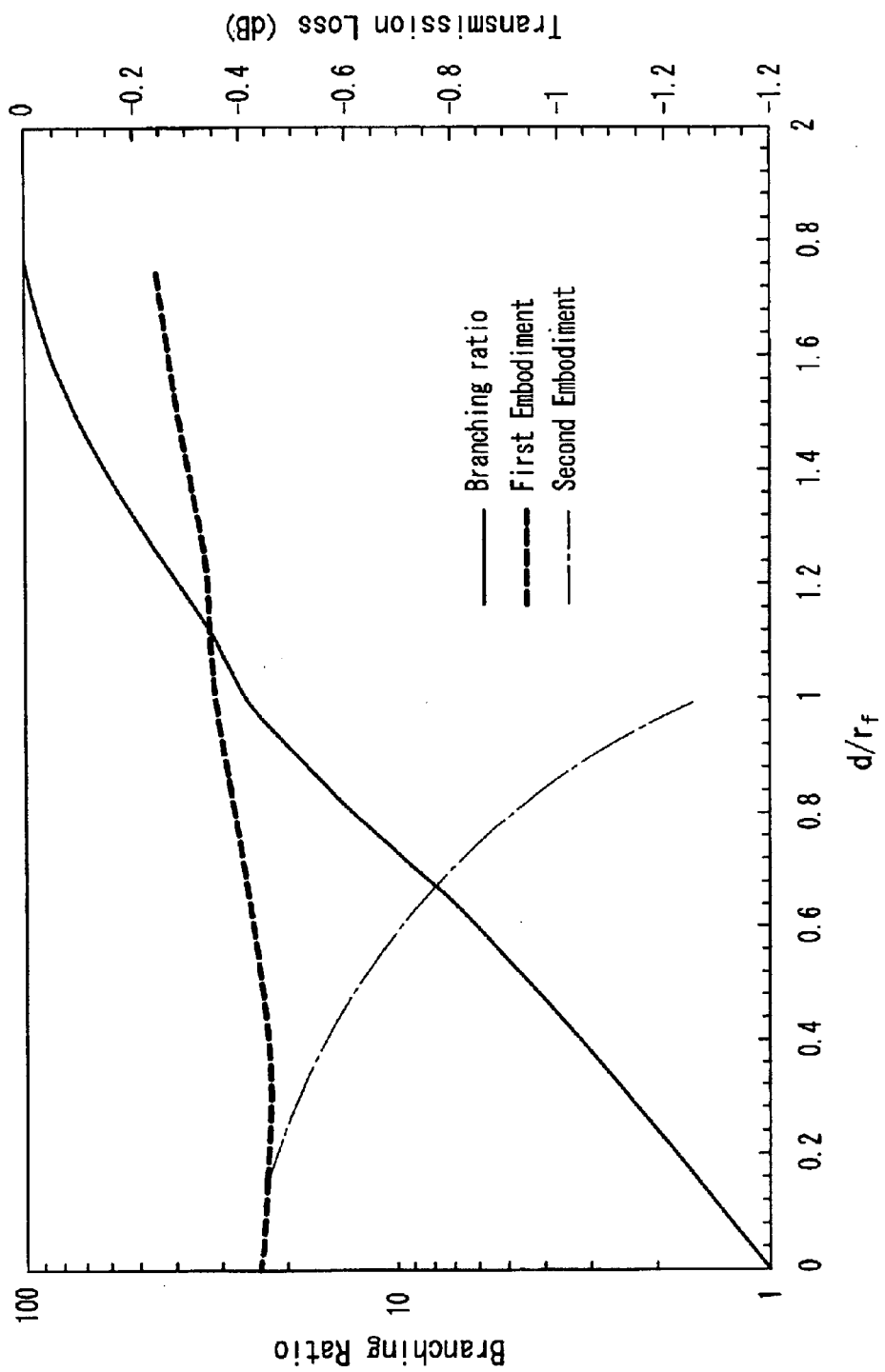
FIG. 4 is a diagram showing the relationship between the branching ratio and the transmission loss of the optical devices according to the first and the second embodiments of the invention.

FIG. 4 shows the relationship between the branching ratio and the transmission loss of the optical device according to the first embodiment and the optical device according to the second embodiment. The short dashed line denotes the optical device of the first embodiment and the long-short dashed line denotes the optical device according to the second embodiment, and the drawing shows the relationship of the transmission loss to the change in $d/r_f$, where the radius $r_f$ of the input-side optical fiber 10 is the same for both devices and d is the distance between the optical axis 14 of the input-side optical fiber 10 and the junction face 13 of the composite photonic crystal 6. Also, the solid line denotes the branching ratio with respect to $d/r_f$.

As can be understood from FIG. 4, the optical device according to the first embodiment exhibits favorable transmission loss of no more than –0.4 [dB] regardless of the $d/r_f$, whereas the optical device according to the second embodiment exhibits a dramatic increase in transmission loss after $d/r_f$ becomes greater than 0.3.

These results are due to the fact that in the first embodiment the composite photonic crystal 6 is driven, which means that the positional relationship between the input-side optical fiber 10 and the first and the second output-side optical fibers 11 and 12 does not change, whereas in the second embodiment, the input-side optical fiber 10 is driven, and thus the positional relationship between the input-side optical fiber 10 and the first and the second output-side optical fibers 11 and 12 is changed. That is, the spot of emission on the end face on the output side of the composite photonic crystal 6 is shifted in correspondence with the shift in the input-side optical fiber 10, so that with the optical device according to the second embodiment, the composite photonic crystal 6 is not effectively coupled to the first and the second output-side optical fibers 11 and 12. To fix this, the first output-side optical fiber 11 and the second output-side optical fiber 12 can be driven at the same time that the input-side optical fiber 10 is driven, in which case the transmission loss will not increase.

It should be noted that even with the optical device according to the second embodiment, if the branching ratio is about 3, which is the branching ratio of conventional branching ratio-variable optical splitters using MMI, then the transmission loss is sufficiently low and is equivalent to that of the optical device according to the first embodiment.

Third Embodiment

Figure 5:
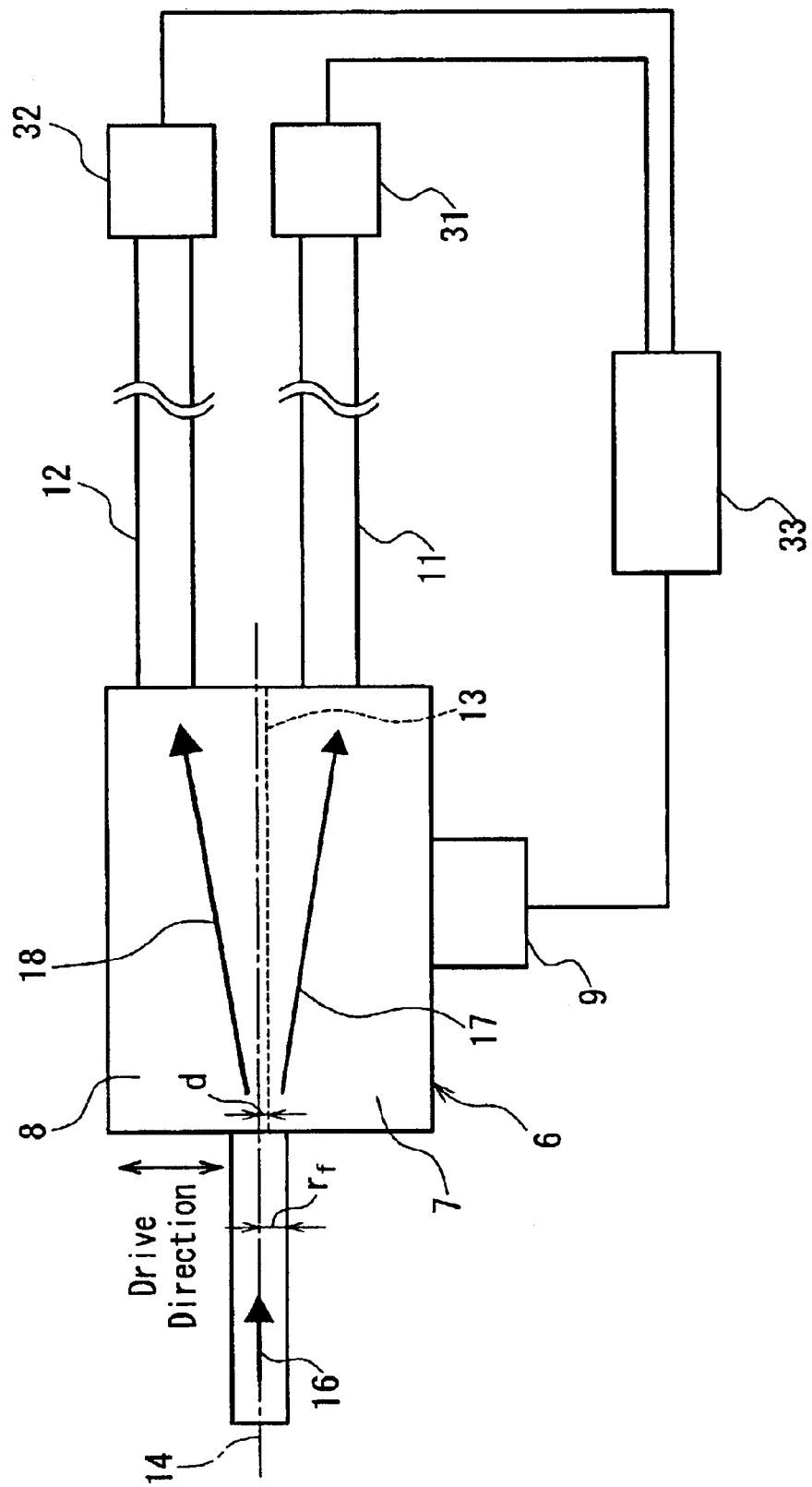
FIG. 5 is a plan view showing the configuration of the optical device of the third embodiment of the invention.

An optical device according to a third embodiment of the invention is described with reference to FIG. 5. The optical device according to the third embodiment is provided with a first monitor portion 31, a second monitor portion 32, and a calculation control portion 33, in addition to the configuration of the optical device according to the first embodiment. With this optical device, the precision of the branching controls is increased by monitoring the amount of light on the output side and using feedback control.

The first monitor portion 31, which monitors the amount of light that is propagated through the first output-side optical fiber 11, is placed on the first output-side optical fiber 11, and the second monitor portion 32, which monitors the amount of light that is that propagated through the second output-side optical fiber 12, is placed on the second output-side optical fiber 12. Also, the first monitor portion 31 and the second monitor portion 32 convert information on the amount of light that is propagated through the first and the second output-side optical fibers 11 and 12 that they have monitored, respectively, into signals and send these to the calculation control portion 33.

The calculation control portion 33 controls the external drive portion 9, indicating an amount to drive the composite photonic crystal 6 to the external drive portion 9 so that a desired value for the branching ratio of the light is attained. The external drive portion 9 follows the command of the calculation control portion 33 and drives the composite photonic crystal 6, setting the distance d between the optical axis 14 and the junction face 13 to an appropriate value.

Based on the signals from the first and the second monitor portions 31 and 32 indicating the amount of light of the first and the second output-side optical fibers 11 and 12, respectively, the calculation control portion 33 controls the external drive portion 9 so that the amount of light assumes the desired branching ratio.

For example, there is the possibility that a change in external conditions, for example, may alter the branching ratio, causing it to diverge from the desired branching ratio. However, the first monitor portion 31 and the second monitor portion 32 monitor the amount of light that is branched and transmit signals indicating this amount to the calculation control portion 33, allowing the calculation control portion 33 to calculate the amount of change and send commands to the external drive portion 9 to adjust the shift amount so that the light is branched at the desired branching ratio. Accordingly, the distance d between the optical axis 14 and the junction face 13 is adjusted to achieve the desired branching ratio. Such feedback control allows a desired branching ratio to be maintained, and thus the precision of the branching ratio is improved and the branching ratio can be held constant regardless of changes in the external environment.

As described above, with the optical device of the third embodiment, the optical splitter has a simple configuration and the branching ratio is variable, and moreover very precise branching control is carried out using feedback control.

It should be noted that as long as the relationship between the amount of the branched light is known, the first monitor portion 31 and the second monitor portion 32 do not have to directly monitor the light that is propagated through the first output-side optical fiber 11 and the second output-side optical fiber 12, and it is possible for another optical system so be interposed between the first output-side optical fiber 11 and the first monitor portion 31 or between the second output-side optical fiber 12 and the second monitor portion 32.

Fourth Embodiment

An optical device according to a fourth embodiment of the invention is described using FIG. 6. The optical device of the fourth embodiment has the same configuration as the optical device according to the first embodiment, except that it is employed as an optical switch.

From the relationship between a normalized shift amount $d/r_f$, the branching ratio and transmission loss shown in FIG. 4, it is clear that for $d/r_f>1$ a branching ratio of 20 or more can be obtained. Here, the extinction ratio can be expressed as 10×log (branching ratio). Thus, it is clear that the extinction ratio at this time is at least 10×log 20, that is, at least 13 dB. If the extinction ratio is 13 dB or more, then it is clear that light is output from only one of the output-side optical fibers and that light is not output from the other output-side optical fiber. By attaining $d/r_f>1$, that is, by setting the distance d between the optical axis 14 and the junction face 13 greater than the core radius $r_f$ of the input-side optical fiber 10, it is possible for the light of only one of the two output-side optical fibers-to be propagated. As shown in FIG. 6, the output-side optical fiber through which light is to be propagated can be selected by changing the direction in which the optical axis 14 is shifted off of the junction face 13, and thus the optical device can be employed as a switch.

More specifically, as shown in FIG. 6A, if the optical axis 14 is shifted off the junction face 13 toward the second output-side optical fiber 12 just enough so that $d/r_f>1$, then the incident light 16 is diverted in the progress direction 19 and is incident only on the second output-side optical fiber 12. Conversely, as shown in FIG. 6B, if the optical axis 14 is shifted off the junction face 13 toward the first output-side optical fiber 11 just enough so that $d/r_f > 1$, then the incident light 16 is diverted in the progress direction 20 and is incident only on the first output-side optical fiber 11.

It should be noted that increasingly favorable switching (a larger extinction ratio) is exhibited the larger $d/r_f$ becomes, and thus if only this switching function is utilized, then a sufficient extinction ratio can be obtained even if the composite photonic crystal 6 is driven by a small amount, as long as the core radius $r_f$ of the optical fiber is reduced accordingly.

The number of times and the amount that the composite photonic crystal 6 is driven in an optical switch is larger than in an optical splitter, and thus providing a tiny gap at the areas where the composite photonic crystal 6 comes into contact with the input-side optical fiber 10, the first output-side optical fiber 11, and the second output-side optical fiber 12 reduces complications resulting from driving, which is favorable.

Fifth Embodiment

An optical device according to a fifth embodiment of the invention is described with reference to FIG. 7. The optical device according to the fifth embodiment is a so-called drop device for separating a portion of light that is of a desired wavelength.

Figure 7:
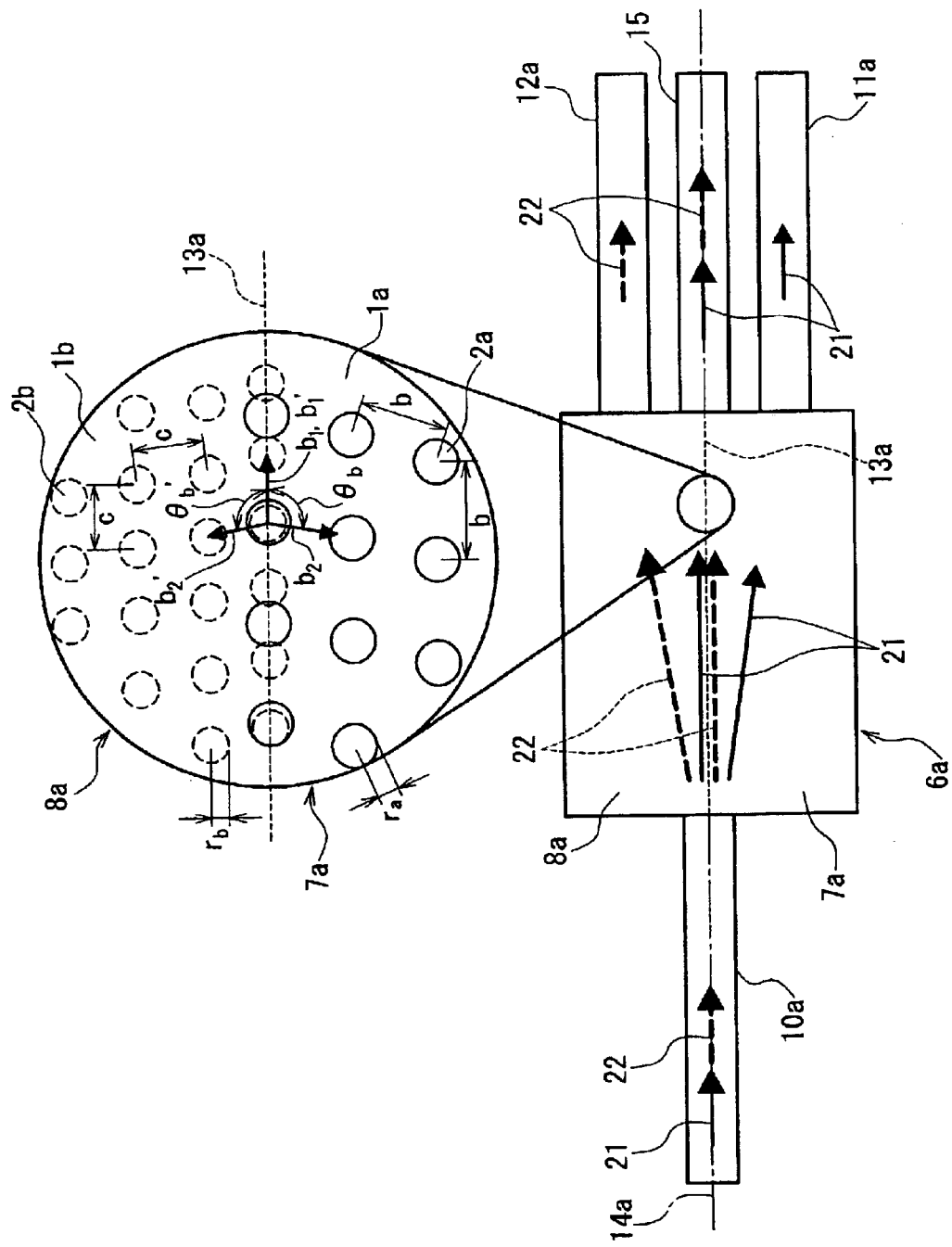
FIG. 7 is a plan view showing the configuration of the optical device of the fifth embodiment of the invention.

As shown in FIG. 7, the optical device according to the fifth embodiment includes a composite photonic crystal 6a on one end of which an input-side optical fiber 10a is arranged and on the other end of which a first output-side optical fiber 11a, a second output-side optical fiber 12a, and a third output-side optical fiber 15 are arranged.

The composite photonic crystal 6a is made by joining together a first photonic crystal 7a and a second photonic crystal 8a at a junction face 13a. The first photonic crystal 7a and the second photonic crystal 8a are photonic crystals with two-dimensional structures in which cylindrical rod-shaped materials 2a and 2b are arranged periodically in background materials 1a and 1b. The center axes of the rod-shaped materials 2a and 2b all may be arranged parallel to one another. The background material 1a of the first photonic crystal 7a and the background material 1b of the second photonic material 8a may be the same material, and the rod-shaped materials 2a and 2b may be the same material.

Using the primitive lattice vectors of the first photonic crystal 7a ($b_1$, $b_2$) and the primitive lattice vectors of the second photonic crystal 8a ($b_1'$, $b_2'$), a specific example of the lattice structures of the first photonic crystal 7a and the second photonic crystal 8a is described. The direction of the first primitive lattice vectors $b_1$, $b_1'$ of the first photonic crystal 7a and the second photonic crystal 8a may be parallel to the junction face 13a of the input-side optical fiber 10a, and the direction of the second primitive lattice vector $b_2$ of the first photonic crystal 7a and the direction of the second primitive lattice vector $b_2'$ of the second photonic crystal 8a may be symmetrical with respect to the junction face 13a.

That is, the angle $\theta_b$ of the primitive lattice vectors ($b_1$, $b_2$) of the first photonic crystal 7a and the angle $\theta_b'$ of the primitive lattice vectors ($b_1'$, $b_2'$) of the second photonic crystal 8a are equal, and $(180-\theta_b)°$ and $(180-\theta_b')°$ are both greater than 60° but smaller than 90°.

The rod-shaped materials 2a and 2b are both present on the junction face 13a. The areas of overlap between the rod-shaped materials 2a and 2b on the junction face 13a are also shown in FIG. 7, but because they are made of the same material, these areas of overlap form a single unit and are not cylindrical.

The radius of the cylindrical rod-shaped material 2a is denoted by $r_a$ and the radius of the cylindrical rod-shaped material 2b is denoted by $r_b$. Also, the distance between adjacent rod-shaped materials 2a is denoted by b, and the distance between adjacent rod-shaped materials 2b is denoted by c. in the first embodiment $r_a = r_b$ and b=c, but in the fifth embodiment $r_a > r_b$ and b>c. Thus, the first photonic crystal 7a and the second photonic crystal 8a are provided with different lattice structures that divert light of different wavelengths, where the wavelengths $f_1$ and $f_2$ denote the wavelengths that are diverted by the first and the second photonic crystals 7a and 8a, respectively. It should be noted that the lattice constants b and c are 0.4 to 0.6 times the length of the wavelengths $f_1$ and $f_2$, and $r_a$ and $r_b$ are 0.08 to 0.3 times the wavelengths $f_1$ and $f_2$.

For example, a lattice structure is provided in which light of wavelength $f_1$ is diverted 10° as it is propagated through the first photonic crystal 7a and light of the wavelength $f_2$ is diverted 10° as it is propagated through the second photonic crystal 8a.

An optical axis 14a of the input-side optical fiber 10a may be identical to the direction of the primitive lattice vector $b_1$, $b_1'$ of the first photonic crystal 7a and the second photonic crystal 8a, and is included in the junction face 13a. The first output-side optical fiber 11a is arranged at the end face of the first photonic crystal 7a and the second output-side optical fiber 12a is arranged at the end face of the second photonic crystal 8a. The third output-side optical fiber 15 is arranged at the end face of the composite photonic crystal 6a with the optical axis 14a as its central axis.

A progress direction 21 of light of wavelength $f_1$ and a progress direction 22 of light of wavelength $f_2$ will be described. When light beams of the two wavelengths $f_1$ and $f_2$ are incident on the composite photonic crystal from the input-side optical fiber 10a, then, as shown by the progress direction 21, light of the wavelength $f_1$ that is incident more on the first photonic crystal 7a side than on the junction face 13a is diverted and coupled into the first output-side optical fiber 11a. Also, light of wavelength $f_1$ that is incident more on the second photonic crystal 8a side than on the junction face 13a proceeds unchanged in a straight line and is coupled into the third output-side optical fiber 15.

On the other hand, as shown by the progress direction 22, light of the wavelength $f_2$ that is incident more on the second photonic crystal 8a side than on the junction face 13a is diverted and coupled into the second output-side optical fiber 12a. Also, light of wavelength $f_2$ that is incident more on the first photonic crystal 7a side than on the junction face 13a proceeds unchanged in a straight line and is coupled into the third output-side optical fiber 15.

It should be noted that the positions in which the first output-side optical fiber 11a and the second output-side optical fiber 12a are arranged are determined so that light beams that are diverted by the composite photonic crystal 6 are coupled.

Also, it is also possible for only the rod-shaped material 2a of the first photonic crystal 7a or for only the rod-shaped material 2b of the second photonic crystal 8a to be present on the junction face 13a.

As described above, with the optical device of the fifth embodiment, a portion of the wavelength $f_1$ light and a portion of the wavelength $f_2$ light can be separated from light consisting of the two different wavelengths $f_1$ and $f_2$. Also, this optical device allows smaller sizes to be achieved.

Sixth Embodiment

Figure 8:
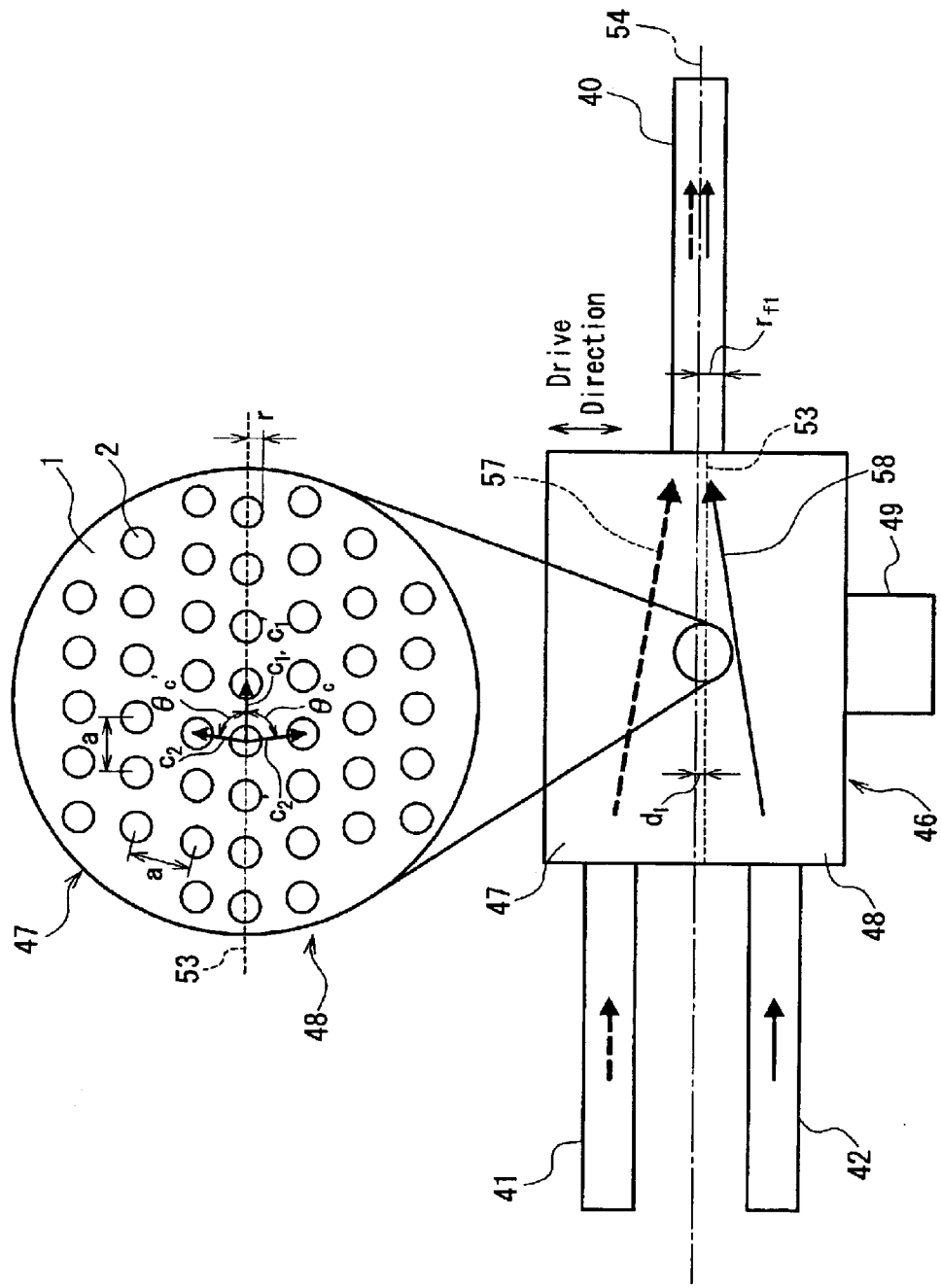
FIG. 8 is a plan view showing the configuration of the optical device of the sixth embodiment of the invention.

An optical device according to a sixth embodiment of the invention is described using FIG. 8. The optical device according to the sixth embodiment is a coupling ratio-variable optical coupler. As shown in FIG. 8, the optical device of the sixth embodiment includes a composite photonic crystal 46 on one end of which a first input-side optical fiber 41 and a second input-side optical fiber 42 are arranged and on the other end of which an output-side optical fiber 40 is arranged. Also, the composite photonic crystal 46 is provided with an external drive portion 49, which is capable of driving the composite photonic crystal 46 relative to, e.g. perpendicularly, with respect to an optical axis 44 of the output-side optical fiber 40.

The composite photonic crystal 46 includes a first photonic crystal 47 and a second photonic crystal 48 joined at a junction face 53, and the lattice structures of the two photonic crystals may be mirror-symmetrical with respect to the junction face 53.

The first photonic crystal 47 and the second photonic crystal 48, like the first and the second photonic crystals of the first embodiment, have oblique lattice structures with poor symmetry. The composite photonic crystal 46 has the same structure as the composite photonic crystal that is used in the first embodiment, except that its incident end and emission end are reversed. That is, when light of a predetermined wavelength is incident in the direction of the primitive lattice vectors $c_1$, $c_1'$ from the incident end side of the composite photonic crystal 46, the light is diverted in a direction that approaches the junction face 53 (paths 57, 58) inside the composite photonic crystal 46.

The specific structure of the first photonic crystal 47 and the second photonic crystal 48 is described. The angle formed by the primitive lattice vector $c_1$ and the primitive lattice vector $c_2$, of the first photonic crystal 47 and the angle formed by the primitive lattice vector $c_1'$ and the primitive lattice vector $c_2'$ of the second photonic crystal 48 are equal, and the acute angles, $\theta_c$ and $\theta_c'$, of these angles are both greater than 60° but smaller than 90°.

The lattice constant a, which is the distance between each rod-shaped material 2 arranged side by side with their central axes parallel in a background material 1, is 0.4 to 0.6 times the wavelength of the incident light that is diverted. The radius r of the rod-shaped material 2 in the first and the second photonic crystals 47 and 48 is 0.08 to 0.3 times the wavelength of the incident light that is diverted. It should be noted that a two-dimensional photonic crystal structure can be achieved by providing holes in a background material 1 made of a polymer or glass, for example. Thus, a two-dimensional photonic crystal in which the rod-shaped material 2 is air can be achieved. As other examples, a rod-shape material 2 made of a polymer or glass, for example, having a refractive index of about 1.5 can be distributed throughout a background material 1 made of Si, GaAs, or $Ti_2O_5$, for example, having a refractive index of about 3. Examples of a polymer material include acrylic-based polymers (PMMA, UV acrylate polymers, etc.), epoxy-based polymers, polyimide-based polymers, silicon-based polymers, and carbonate-based polymers (polycarbonate).

The refractive indices of the background material 1 and the rod-shape material 2 are the important point in determining the properties of the photonic crystal. Thus as long as materials that fulfill the above-mentioned refractive index conditions are used, a desired photonic crystal can be fabricated using materials other than those mentioned above, including solids (for example, dielectrics such as oxides), liquids (for example, water or ethylene glycol), and gases (for example, air and inert gases).

It should be noted that the composite photonic crystal 46 can be provided with a substrate or a cladding layer, the refractive index of which should be lower than that of the background material 1 and equal to or lower than that of the rod-shaped material 2, for example.

The optical axis 54 of the input-side optical fiber 40 may be identical in direction to the primitive lattice vectors $c_1$, $c_1'$ of the first photonic crystal 47 and the second photonic crystal 48, and is arranged near the junction face 53. The first input-side optical fiber 41 is arranged at an end face of the first photonic crystal 47 and the second input-side optical fiber 42 is arranged at an end face of the second photonic crystal 48. The second input-side optical fiber 42 and the first input-side optical fiber 41 are arranged so that they are symmetrical about the optical axis 54 of the output-side optical fiber 40. Light that is incident on the composite photonic crystal 46 from the first input-side optical fiber 41 and the second input-side optical fiber 42 may be incident in the direction of the primitive lattice vectors $c_1$, $c_1'$ of the first photonic crystal 47 and the second photonic crystal 48.

The light that is incident from the first input-side optical fiber 41 is a predetermined light that is diverted in the first photonic crystal 47, and the light that is incident from the second input-side optical fiber 42 is a predetermined light that is diverted in the second photonic crystal 48.

With the optical axis 54 located on the junction face 53, when light is incident on the first photonic crystal 47 and the second photonic crystal 48 from the first input-side optical fiber 41 and the second input-side optical fiber 42, then these light beams are diverted to and progress in the directions indicated by the progress direction 57 and the progress direction 58. These two light beams draw close to the junction face 53 and are coupled on the junction face 53. The coupling ratio of these light beams is 1:1, and they are coupled at an equal ratio. The coupled light is incident on the output-side optical fiber 40 from the composite photonic crystal 46. The angle formed at this time by the progress directions 57 and 58 is the coupling angle, and is about 20°. Because a coupling angle more than ten times that of a conventional optical coupler is obtained, it is possible to reduce the length of the optical coupler.

The optical device of the sixth embodiment is provided with an external drive portion 49 for driving the composite photonic crystal 46, e.g. perpendicularly, with respect to the junction face 53. By driving the composite photonic crystal 46 in a perpendicular direction using the external drive portion 49 to shift the optical axis 54 off of the junction face 53, the coupling ratio is changed in correspondence with the amount that the composite photonic crystal 46 is shifted. More specifically, the proportion of light from the input-side optical fiber that is farther from the junction face 53 is increased. In FIG. 8, the distance between the junction face 53 and the first input-side optical fiber 41 is greater than the distance between the junction face 53 and the second input-side optical fiber 42. Consequently, coupled light that has been coupled at a coupling ratio where the proportion of light from the first input-side optical fiber 41 is high is output from the output-side optical fiber 40. The amount of shift is controlled by the external drive portion 49 to achieve a desired coupling ratio.

If the distance $d_1$ between the optical axis 54 and the junction face 53, which corresponds to the amount that the composite photonic crystal 46 has been shifted, is greater than the core radius $r_{f1}$ (for example, approximately 4 $\mu$m) of the output-side optical fiber 40, then the coupled light is no longer incident on the output-side optical fiber 40, and thus it is sufficient for the external drive portion 49 to have a drive region of only the core radius $r_{f1}$ and to be able to drive within that range. The external drive portion 49 can be achieved using a MEMS, a piezoelectric element, or a motor (such as a step motor or an ultrasound motor), for example.

Thus, according to the optical device of the sixth embodiment, by controlling the relative positions of the junction face 53 of the composite photonic crystal 46 and the optical axis 54 of the output-side optical fiber 40 using the external drive portion 49, the coupling ratio of the optical component that is propagated through the first photonic crystal 47 and the optical component that is propagated through the second photonic crystal 48 can be controlled. This allows the incident light to be coupled at a coupling angle of about 20° and moreover allows an optical device with which the coupling ratio can be changed dynamically to be achieved. Also, the optical device can be manufactured easily because it is configured using a photonic crystal instead of a waveguide.

Seventh Embodiment

Figure 9:
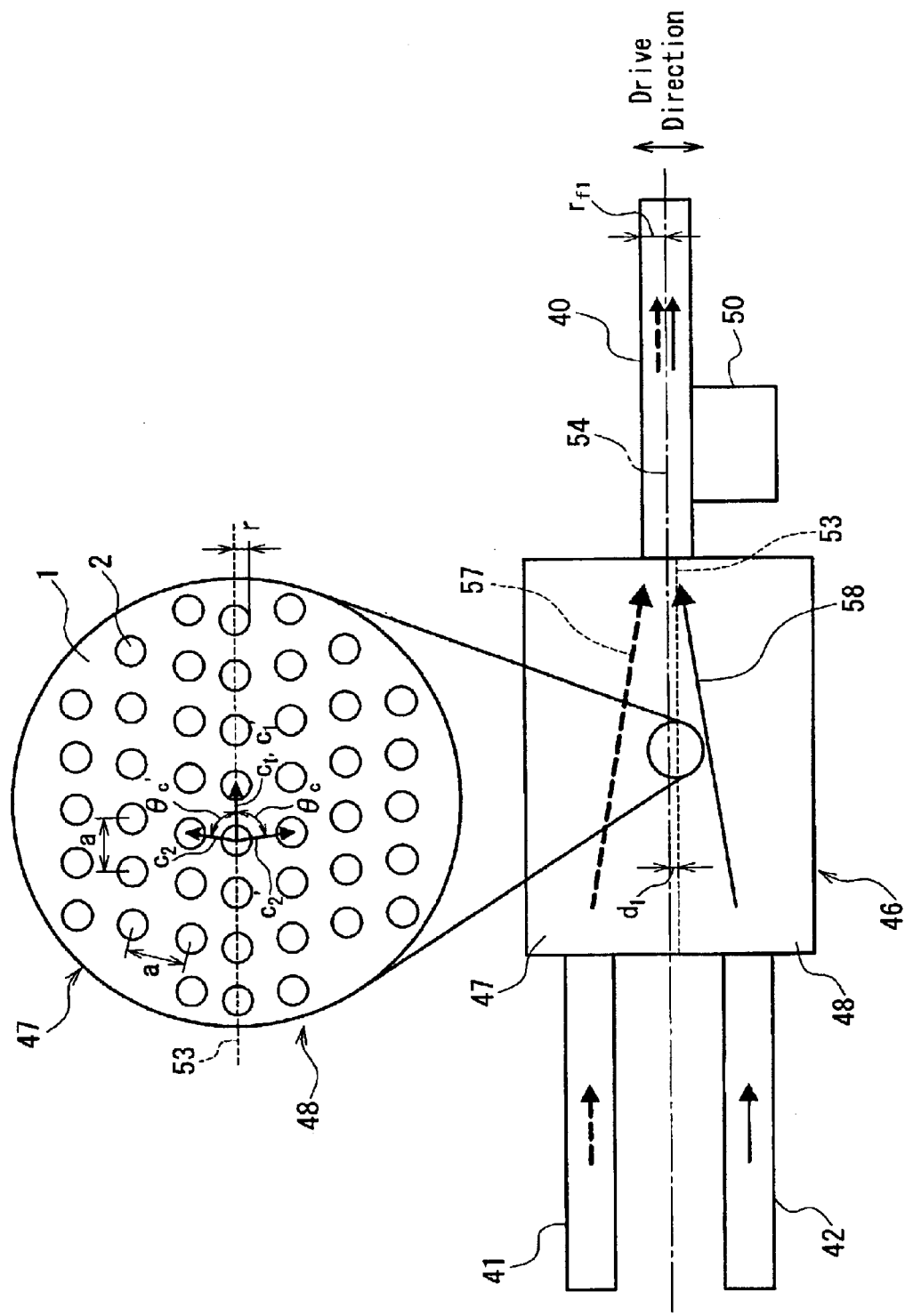
FIG. 9 is a plan view showing the configuration of the optical device of the seventh embodiment of the invention.

An optical device according to a seventh embodiment of the invention is described using FIG. 9. The optical device according to the seventh embodiment is identical to the optical device according to the sixth embodiment except that it has been provided with an external drive portion 50 for driving the output-side optical fiber 40, e.g. perpendicularly, with respect to the optical axis 54 in place of the external drive portion 49 for shifting the compound photonic crystal 46.

With the optical device according to the seventh embodiment, the output-side optical fiber 40 is shifted using the external drive portion 50 to alter the distance between the optical axis 54 and the junction face 53 and thereby control the coupling ratio of the light. The coupling ratio is determined by the distance $d_1$ between the optical axis 54 and the junction face 53. Also, it is sufficient for the distance $d_1$ to be only the core radius $r_{f1}$, and the external drive portion 50 can be achieved using a MEMS, a piezoelectric element, or a motor (such as a step motor or an ultrasound motor), for example.

Thus, like the optical device according to the sixth embodiment, it is possible to achieve an optical device with which the coupling ratio can be dynamically changed.

Eighth Embodiment

Figure 10:
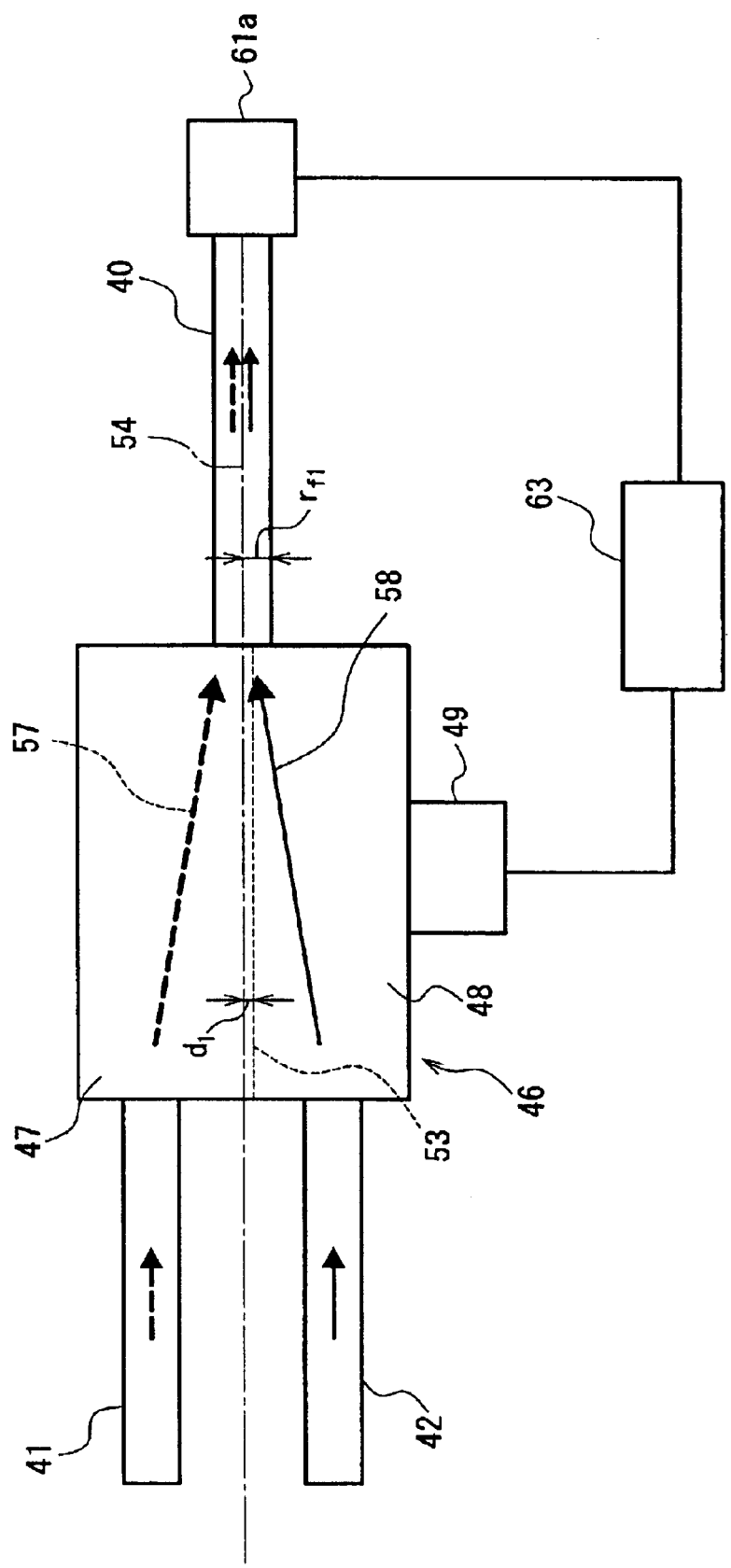
FIG. 10 is a plan view showing the configuration of the optical device of the eighth embodiment of the invention.

An optical device according to an eighth embodiment of the invention is described using FIG. 10. The optical device of the eighth embodiment is identical to the optical device according to the sixth embodiment except that it further includes a monitor portion 61a and a calculation control portion 63, increasing the precision of the coupling controls by monitoring the quantity of light on the output side and using feedback controls.

The monitor portion 61a for monitoring the quantity of light propagated through the output side optical fiber 40 is arranged on the output-side optical fiber 40, and converts data on the quantity of light propagated through the output-side optical fiber 40 that it has monitored into signals and sends these signals to the calculation control portion 63.

The calculation control portion 63 is for controlling the external drive portion 49, and sends a command regarding the drive amount of the composite photonic crystal 46 to the external drive portion 49 so that the coupling ratio of the light propagated through the output-side optical fiber 40 is set to a desired value. In accordance with this command from the calculation control portion 63, the external drive portion 49 drives the composite photonic crystal 46 so as to set the distance $d_1$ between the optical axis 54 and the junction face 53 to the appropriate value. A current coupling ratio is determined based on the signals from the monitor portion 61a indicating the amount of light that is propagated through the output-side optical fiber 40, and the calculation control portion 63 controls the external drive portion 49 so that the desired coupling ratio is attained.

Changes in the external conditions, for example, may alter the coupling ratio, leading to a coupling ratio that is different from the desired coupling ratio. However, because the amount of coupled light is monitored by the monitor portion 61a and signals regarding this amount are transmitted to the calculation control portion 63, the calculation control portion 63 calculates the amount of change and directs the external drive portion 49 to correct the shift amount of the composite photonic crystal 46, thereby adjusting the distance $d_1$ between the optical axis 54 and the junction face 53, so that the light is coupled at the desired coupling ratio. Thus, with the optical device of the eighth embodiment, a desired coupling ratio is maintained through feedback control, so that the precision of the coupling ratio is increased and the coupling ratio can be held constant regardless of changes to the external environment. Accordingly, very precise coupling control can be obtained.

It should be noted that it is sufficient that the monitor portion 61a ascertain the quantity of the coupled light, and thus it is not necessary that the monitor portion 61a directly monitor the light that is propagated through the output-side optical fiber 40, and other optical systems may be interposed between the output-side optical fiber 40 and the monitor portion 61a.

Ninth Embodiment

Figure 11:
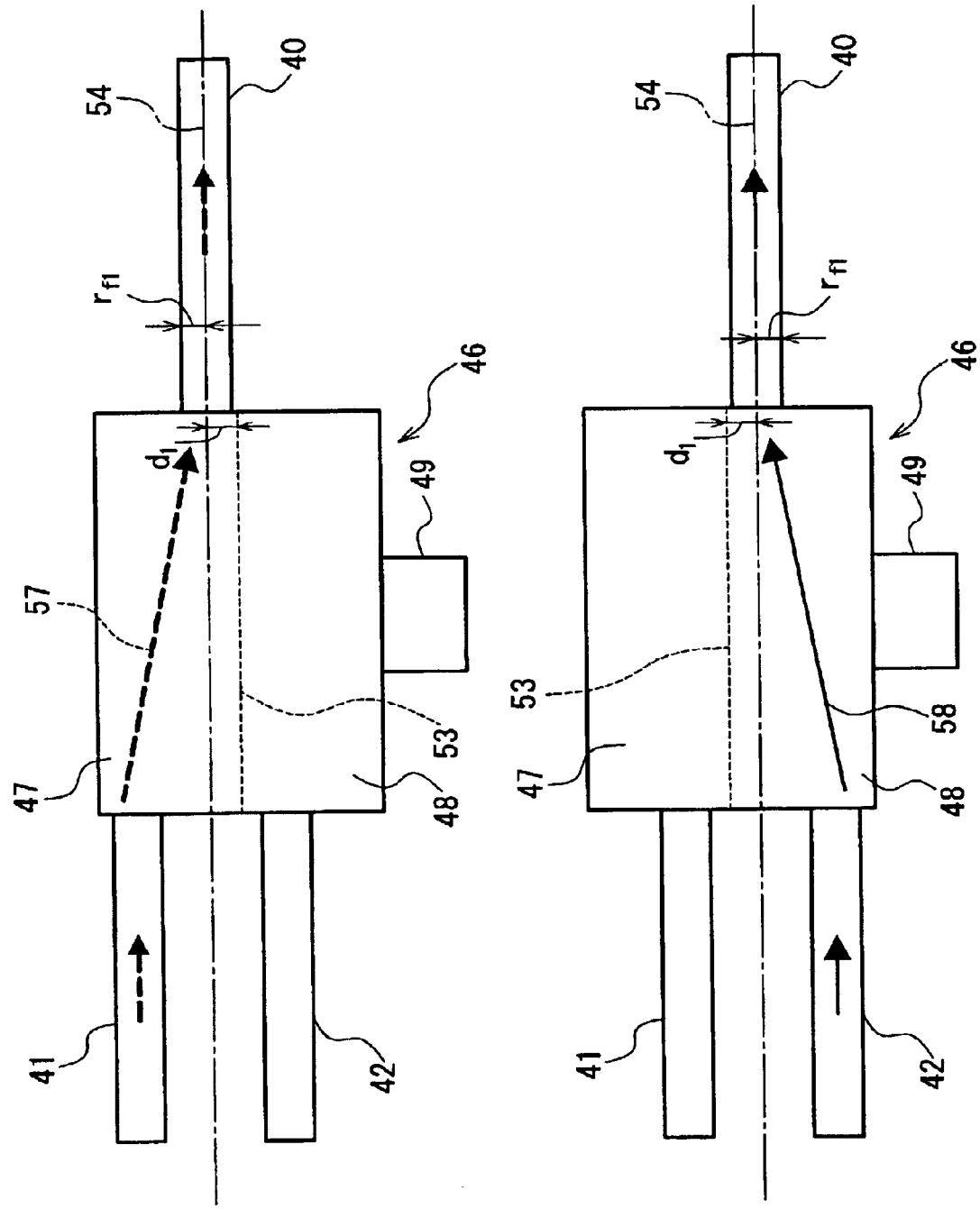
FIGS. 11a–b are plan views showing the configuration of the optical device of the ninth embodiment of the invention.

An optical device according to a ninth embodiment of the invention is described using FIG. 11. The structure of the optical device of the ninth embodiment is identical to that of the optical device according to the sixth embodiment, except that it is employed as an optical switch.

By attaining a normalized shift amount of $d_1/r_{f1}>1$ for the optical device of the ninth embodiment, that is, by setting the distance $d_1$ between the optical axis 54 and the junction face 53 to greater than the core radius $r_{f1}$ of the output-side optical fiber 40, light that is incident from only one of the two input-side optical fibers can be propagated through the output-side optical fiber 40.

As shown in FIG. 11, the optical device of the ninth embodiment can be employed as an optical switch, as light from either the first input-side optical fiber or the second input-side optical fiber can be selected by altering the direction in which the optical axis 54 is shifted off of the junction face 53 and output from the output-side optical fiber 40.

More specifically, as shown in FIG. 11A, if the junction face 53 is shifted away from the optical axis 54 toward the second input-side optical fiber 42 just enough so that $d_1/r_{f1}>1$, then only incident light from the first input-side optical fiber 41 is incident on the output-side optical fiber 40. The incident light from the second input-side optical fiber 42 is diverted by the second photonic crystal 48 and arrives at the junction face 53 before arriving at the emission end of the composite photonic crystal 46, and thus is not incident on the output-side optical fiber 40.

Conversely, as shown in FIG. 11B, if the junction face 53 is shifted away from the optical axis 54 toward the first input-side optical fiber 41 just enough so that $d_1/r_{f1}>1$, then only incident light from the second input-side optical fiber 42 is incident on the output-side optical fiber 40.

Also, if light from only one of the input-side optical fibers of an optical coupler employing a Y-branched waveguide is incident, then light at only half the intensity of the incident light is propagated through the output-side optical fiber.

However, with the optical switch of the ninth embodiment, light at the full intensity of the incident light is propagated without attenuation, even though incident light from only one of the first input-side optical fiber 41 and the second input-side optical fiber 42 is propagated by the output-side optical fiber 40.

It should be noted that increasingly favorable switching (a larger extinction ratio) is exhibited the larger $d_1/r_{f1}$ becomes, and thus if only the switching function is utilized, then a sufficient extinction ratio can be obtained even if the composite photonic crystal 46 is driven only a small amount, as long as the core radius $r_{f1}$ of the optical fiber is reduced accordingly.

Also, this optical device can be used to achieve an attenuator with 100% maximum transmission by removing one of the input-side optical fibers to set the number of incident light beams to one and achieving $d_1/r_{f1}>1$.

It should be noted that as an optical switch, the number of times and the amount that the composite photonic crystal 46 is driven is greater than if the optical device is employed as an optical coupler, and thus a slight gap should be provided between the areas where the first input-side optical fiber 41, the second input-side optical fiber 42, and the output-side optical fiber 40 come into contact with the composite photonic crystal 46 in order to reduce complications that arise from driving, which is favorable.

In the above, the optical couplers according to the sixth to ninth embodiments and the optical splitters shown in the first through fourth embodiments have opposite input and output sides. However, if the optical device is an optical coupler, then loss occurs in the intensity of the coupled light due to the relative shift between the optical axis 54 and the junction 53, whereas if the optical device is an optical splitter, then the incident light is branched without losing intensity. That is, the input/output characteristics of an optical coupler and an optical splitter are not reversible. Consequently, to allow the optical device to function as both an optical splitter and an optical coupler, it is necessary to detect the input and output direction of light beams, and based on the results of this detection, to dynamically control the relative positions between the junction face 13, 53 of the composite photonic crystal 6, 46 and the optical axis 14, 54 using the external drive portion 49 so as to allow the desired function to be exhibited in correspondence with the direction of light progress.

Tenth Embodiment

Figure 12:
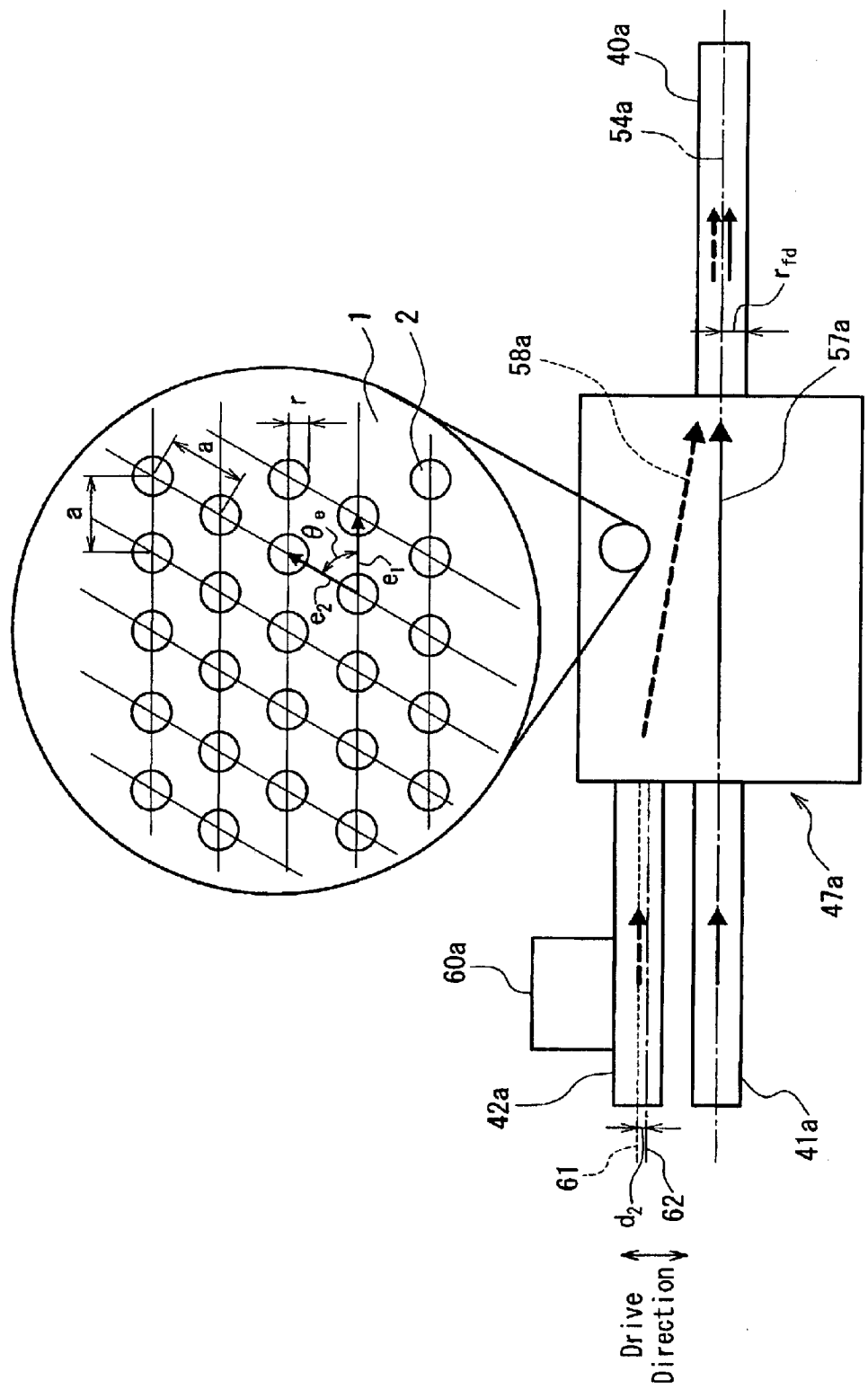
FIG. 12 is a plan view showing the configuration of the optical device of the tenth embodiment of the invention.
Figure 13A:
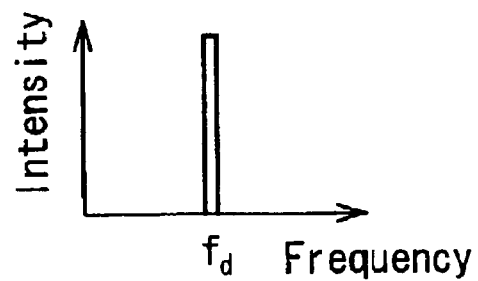
FIGS. 13a–d are diagrams showing the spectra of the incident light and the emission light of the optical device according to the tenth embodiment of the invention.
Figure 13B:
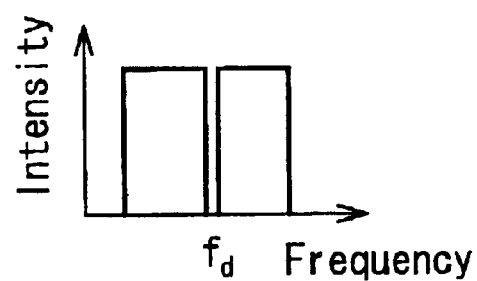
Figure 13C:
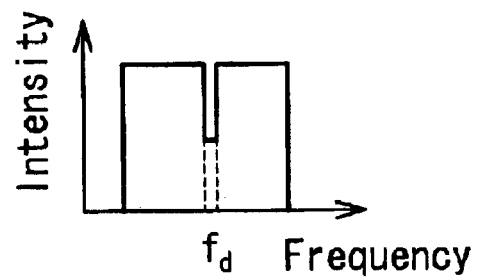
Figure 13D:
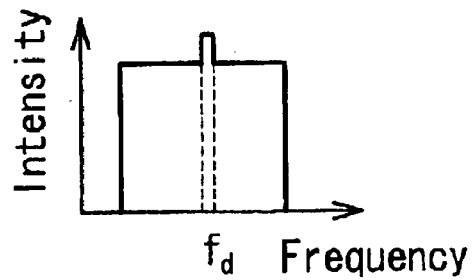

An optical device according to a tenth embodiment of the invention is described using FIG. 12. The optical device according to the tenth embodiment is a so-called gain-variable add device (gain-variable optical multiplexer) for multiplexing light of a desired wavelength with other light.

As shown in FIG. 12, the optical device according to the tenth embodiment includes a photonic crystal 47a on one end of which a first input-side optical fiber 41a and a second input-side optical fiber 42a are arranged and on the other end of which an output-side optical fiber 40a is arranged. The optical axis of the first input-side optical fiber 41a is arranged so that it is equivalent to an optical axis 54a of the output-side optical fiber 40a, and is parallel to the optical axis 54a.

Also, the second input-side optical fiber 42a is provided with an external drive portion 60a, which is capable of driving the second input-side optical fiber 42a e.g. perpendicularly, with respect to the optical axis 54a.

The photonic crystal 47a of the tenth embodiment, like the photonic crystal 47 of the sixth embodiment, has an oblique lattice structure with poor symmetry. When light is incident in the direction of the primitive lattice vector $e_1$ of the photonic crystal 47a, the light is diverted inside the photonic crystal 47a.

The specific structure of the photonic crystal 47a is described below. The acute angle $\theta_e$ formed by the primitive lattice vector $e_1$ and the primitive lattice vector $e_2$ of the first photonic crystal 47a is greater than 60° but smaller than 90°.

The lattice constant a, which is the distance between each cylindrical rod-shaped material 2 arranged side by side with their central axes parallel in a background material, is between 0.4 and 0.6 times the wavelength of the incident light that is diverted, and the radius r of the rod-shaped material 2 in the photonic crystal 47a is 0.08 to 0.3 times the wavelength of the incident light that is diverted. It should be noted that a two-dimensional photonic crystal structure can be achieved by providing holes in a background material 1 made of a polymer or glass, for example. Thus, a two-dimensional photonic crystal in which the rod-shaped material 2 is air can be achieved. As for other configurations, a rod-shape material 2 made of a polymer or glass, for example, having a refractive index of about 1.5 can be distributed throughout a background material 1 made of Si, GaAs, or $Ti_2O_5$, for example, having a refractive index of about 3. Examples of a polymer material include acrylic-based polymers (PMMA, UV acrylate polymers, etc.), epoxy-based polymers, polyimide-based polymers, silicon-based polymers, and carbonate-based polymers (polycarbonate).

The refractive indices of the background material 1 and the rod-shape material 2 are the important point for determining the properties of the photonic crystal 47a. Thus as long as materials that fulfill the above-mentioned refractive index conditions are used, a desired photonic crystal can be fabricated using materials other than those mentioned above, including solids (for example, dielectrics such as oxides), liquids (for example, water or ethylene glycol), and gases (for example, air and inert gases).

It should be noted that the composite photonic crystal 47a can be provided with a substrate or a cladding layer, the refractive index of which should be lower than that of the background material 1 and equal to or lower than that of the rod-shaped material 2, for example. Also, the wavelength of light to be diverted that is incident in the direction of the primitive lattice vector $e_1$ of the photonic crystal 47a shall be $f_d$.

Light of wavelength $f_d$ is propagated through the first input-side optical fiber 41a and is incident on the photonic crystal 47a. Also, a plurality of light beams with wavelengths other than the wavelength $f_d$ are propagated through the second input-side optical fiber 42a and are incident on the photonic crystal 47a.

The optical axes of the first input-side optical fiber 41a and the second input-side optical fiber 42a are both the same as the direction of the primitive lattice vector $e_1$. Consequently, light is incident on the photonic crystal 47a in the same direction as the primitive lattice vector $e_1$.

Light of the wavelength $f_d$ that is incident from the second input-side optical fiber 42a is diverted within the photonic crystal 47a in a progress direction 58a and drawn close to the optical axis 54a. The light that is incident from the first input-side optical fiber 41a proceeds straight along the optical axis 54a in a progress direction 57a. By setting the distance between the first input-side optical fiber 41a and the second input-side optical fiber 42a to the length of the photonic crystal 47a in the optical axis 54a direction multiplied by the tangent of the angle at which the light is diverted within the photonic crystal 47a, the light of wavelength $f_d$ that is diverted and the light that proceeds directly along the optical axis 54a are coupled at the emission end of the photonic crystal 47a at a ratio of 1:1 and emitted to the output-side optical fiber 40a. Also, if the distance between a reference optical axis 62, which is the optical axis of the second input-side optical fiber 42a at this time, and an actual optical axis 61 of the second input-side optical fiber 42a is regarded as $d_2$, then the condition under which the light beams propagated by the first input-side optical fiber 41a and the second input-side optical fiber 42a are coupled at a 1:1 ratio is when $d_2=0$.

Moreover, the second input-side optical fiber 42a can be shifted perpendicularly with respect to the reference optical axis 62 by the external drive portion 60a to misalign the reference optical axis 62 and the optical axis 61. Thus, the spot from which the wavelength $f_d$ light is emitted from the photonic crystal 47a is shifted off of the optical axis 54a of the output-side optical fiber 40a. Accordingly, the amount that the diverted wavelength $f_d$ light is coupled with other light is reduced. That is, by shifting the second input-side optical fiber 42a so that the distance between the reference optical axis 62 and the optical axis 61 is changed, the ratio of light of wavelength $f_d$ that is received is changed, allowing the gain of wavelength $f_d$ light that is multiplexed with light of wavelengths other than $f_d$ to be dynamically changed.

FIG. 13 shows the spectra of incident light and emission light. FIG. 13A shows the spectrum of the incident light that is propagated by the second input-side optical fiber 42a, and is only the light of wavelength $f_d$. FIG. 13B shows the spectrum of incident light propagated by the first input-side optical fiber 41a, and is light other than the wavelength $f_d$. FIGS. 13C and 13D show spectrums of emission light propagated by the output-side optical fiber 40a. The amount of wavelength $f_d$ light that is multiplexed in FIGS. 13C and 13D is different. The gain of the multiplexed light can be controlled using the external drive portion 60a to alter the amount that the second input-side optical fiber 42a is shifted.

Also, it is sufficient for the distance $d_2$ between the reference optical axis 62 and the optical axis 61, which corresponds to the amount that the second input-side optical fiber 42a has been shifted, to be altered only about the core radius $r_{fd}$ (approximately 4 μm) of the output-side optical fiber 40a. Thus the external drive portion 60a can be achieved using a MEMS, a piezoelectric element, or a motor (such as a step motor or an ultrasound motor), for example.

Eleventh Embodiment

Figure 14:
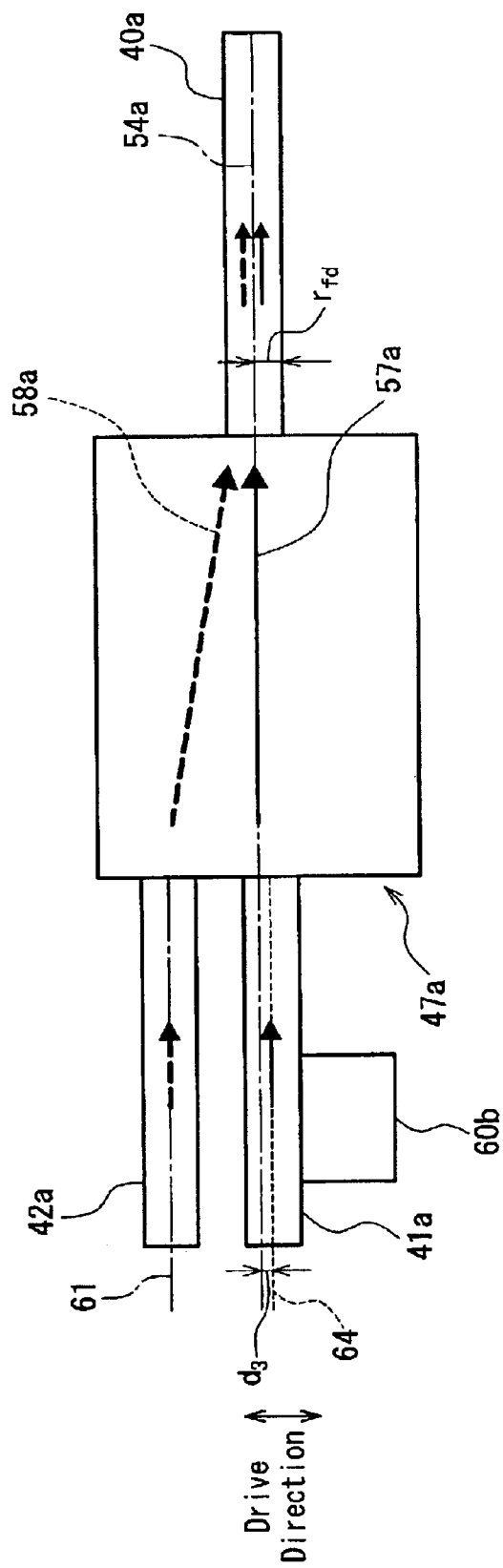
FIG. 14 is a plan view showing the configuration of the optical device of the eleventh embodiment of the invention.
Figure 15A:
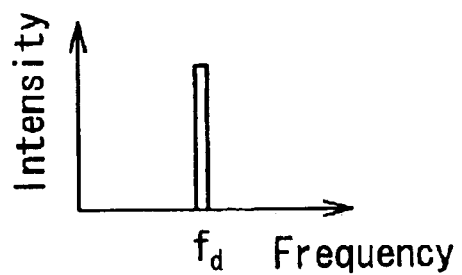
FIGS. 15a–d are diagrams showing the spectra of the incident light and the emission light of the optical device according to the eleventh embodiment of the invention.
Figure 15B:
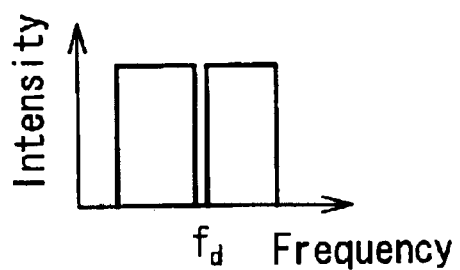
Figure 15C:
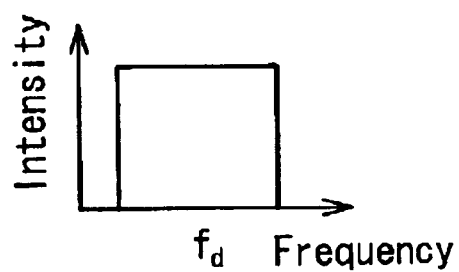
Figure 15D:
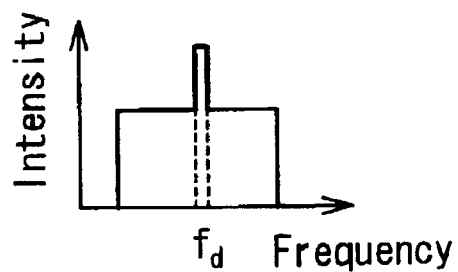

An optical device according to an eleventh embodiment of the invention is described using FIG. 14. The optical device according to the eleventh embodiment is the same as the optical device according to the tenth embodiment, except that, in place of the external drive portion 60a for shifting the second input-side optical fiber 42a, an external drive portion 60b for driving the first input-side optical fiber 41a perpendicularly with respect to the optical axis has been provided.

Also, the distance between the optical axis 61 of the second input-side optical fiber 42a and the optical axis 54a of the output-side optical fiber 40a is the product of the length of the photonic crystal 47a in the optical axis 54a direction and the tangent of the angle at which light is diverted within the photonic crystal 47a.

Light of wavelength $f_d$ from the second input-side optical fiber 42a and a plurality of light beams other than the wavelength $f_d$ light from the first input-side optical fiber 41a are incident on the photonic crystal 47a, and the wavelength $f_d$ light is diverted to the progress direction 58a and light other than the wavelength $f_d$ proceeds straight along the progress direction 57a. If an optical axis 64 of the first input-side optical fiber 41a is identical to the optical axis 54a, then the light of wavelength $f_d$ and all light other than the wavelength $f_d$ are coupled at the emission end of the photonic crystal 47a and emitted to the output-side optical fiber 40a.

However, when the external drive portion 60b is used to shift the first input-side optical fiber 41a, thereby shifting the optical axis 64 off the optical axis 54a, then the spot where the plurality of light beams other than the wavelength $f_d$, which are incident from the second input-side optical fiber, are emitted from the photonic crystal 47a is deviated from the optical axis 54a. Thus, all light beams other than the light of wavelength $f_d$ are not propagated through the output-side optical fiber 40a. That is, by shifting the first input-side optical fiber 41a, the ratio of light of the wavelength $f_d$ to the light other than the wavelength $f_d$ that is received is changed. Therefore, it is possible to dynamically change the gain of the multiplexed light.

FIG. 15 shows the spectra of incident light and emission light. FIG. 15A shows the spectrum of the incident light that is propagated by the second input-side optical fiber 42a, and is only the light of wavelength $f_d$. FIG. 15B shows the spectrum of incident light propagated by the first input-side optical fiber 41a, and is light other than that of the wavelength $f_d$. FIGS. 15C and 15D show spectra of emission light propagated by the output-side optical fiber 40a. The amount of light other than the wavelength $f_d$ that is multiplexed is different in FIGS. 15C and 15D. FIG. 15C illustrates a case where the positions of the optical axis 64 and the optical axis 54a are identical, at which time all light is coupled. FIG. 15D shows a case where the optical axis 64 and the optical axis 54a are misaligned, and it is clear from the drawing that the amount of light other than the wavelength $f_d$ that is multiplexed is reduced.

Consequently, the gain of the light other than wavelength $f_d$ that is multiplexed can be controlled using the external drive portion 60b to alter the amount that the first input-side optical fiber 41a is shifted.

Also, it is only necessary that the distance $d_3$ between the optical axis 54a and the optical axis 64, which corresponds to the amount that the first input-side optical fiber 41a is shifted, is able to be altered by about the core radius $r_{fd}$ (approximately 4 μm) of the output-side optical fiber 40a, and thus the external drive portion 60b can be achieved using a MEMS, a piezoelectric element, or a motor (such as a step motor or an ultrasound motor), for example.

Twelfth Embodiment

Figure 16:
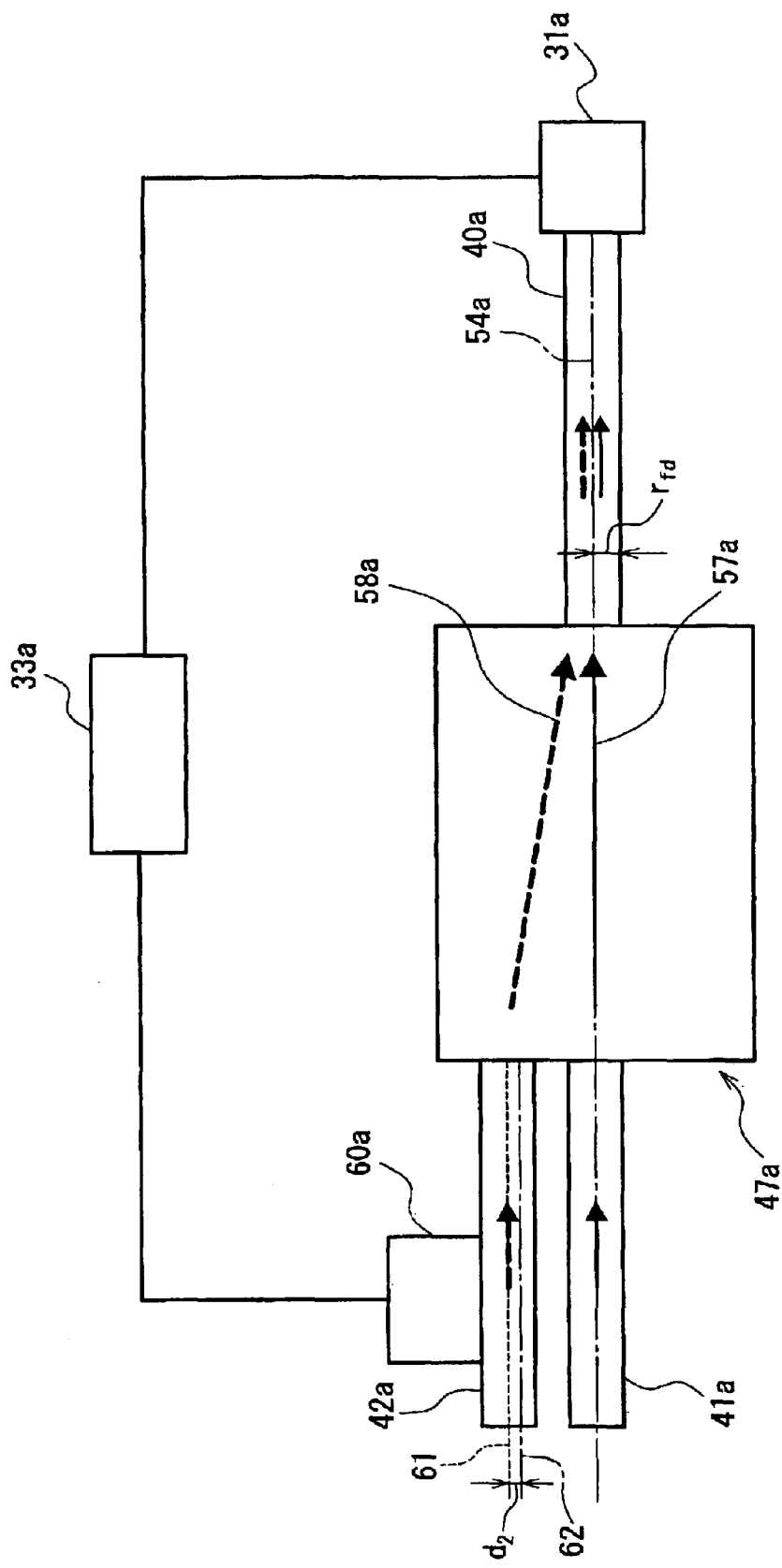
FIG. 16 is a plan view showing the configuration of the optical device of the twelfth embodiment of the invention.

An optical device according to a twelfth embodiment of the invention is described using FIG. 16. The optical device of the twelfth embodiment is identical to the optical device according to the tenth embodiment except that it further has been provided with a monitor portion 31a and a calculation control portion 33a. Thus, by monitoring the quantity of light on the output side, gain can be adjusted using feedback controls, which increases the control precision.

The monitor portion 31a for monitoring the quantity of light propagated through the output-side optical fiber 40a is arranged on the output-side optical fiber 40a, and converts data on the quantity of light propagated through the output-side optical fiber 40a that it has monitored into signals and sends these to the calculation control portion 33a.

The calculation control portion 33a is for controlling the external drive portion 60a, and sends a command regarding the drive amount of the second input-side optical fiber 42a to the external drive portion 60a so that the gain of light that is multiplexed becomes a desired value. In accordance with this command from the calculation control portion 33a, the external drive portion 60a drives the second input-side optical fiber 42a so as to set the distance $d_2$ between the optical axis 62 and the optical axis 61 of the second input-side optical fiber 42a to the appropriate value. Based on the signals from the monitor portion 31a indicating the amount of light of the output-side optical fiber 40a, the calculation control portion 33a controls the external drive portion 60a so that the multiplexed light achieves the desired gain.

It should be noted that it is not necessary that the monitor portion 31a directly monitor the light that is propagated through the output-side optical fiber 40a, and other optical systems may be interposed between the output-side optical fiber 40 and the monitor portion 31a.

As described above, the amount of emission light of the output-side optical fiber 40a is monitored and this result is output as feedback to the external drive portion 60a, allowing the gain of the incident light that is multiplexed to be adjusted and therefore allowing the ratio of the emission light of the wavelength $f_d$ to be freely adjusted. Also, the gain of the multiplexed light can be changed dynamically if necessary in the same system, so that a gain-variable add device (gain-variable optical multiplexer) with which gain can be changed dynamically, which has been very difficult to achieve with conventional multiplex ratio variable multiplexers designed with MMI, for example, can be achieved with a simple configuration.

In the first through twelfth embodiments described above, optical waveguides can be employed in place of optical fibers. Also, in the above description, the optical couplers have a single output-side optical fiber, however, they may have a plurality thereof.

Thirteenth Embodiment

The photonic crystal of an optical device according to a thirteenth embodiment of the invention is described. The photonic crystal that is employed in the optical device of the thirteenth embodiment has a high effect of confining light in its thickness direction. The photonic crystal is for example slab shape. By changing rather than maintaining a constant refractive index distribution in the thickness direction of the photonic crystal, the effect of confining light in the center section in the thickness direction can be increased.

Hereinafter, the refractive index distribution will be described in greater detail. A photonic crystal is used in the following description, however, a composite photonic crystal described above can be used to achieve the same effects, as it is made of photonic crystals.

Figure 17A:
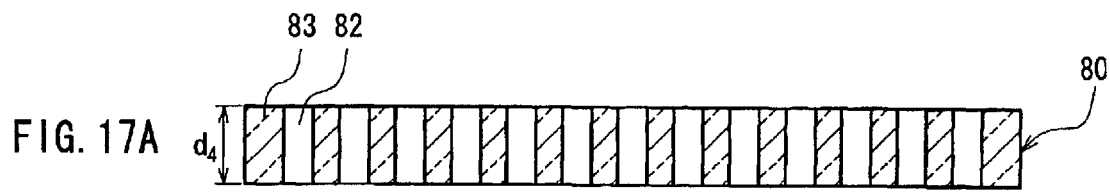
FIGS. 17a–c are lateral cross-sectional views showing the configuration of photonic crystals and substrates of the optical device according to the thirteenth embodiment of the invention.
Figure 17B:
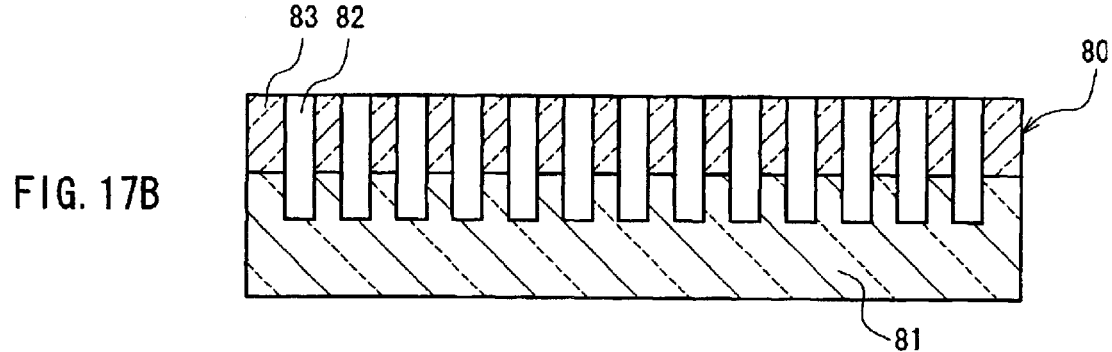
Figure 17C:
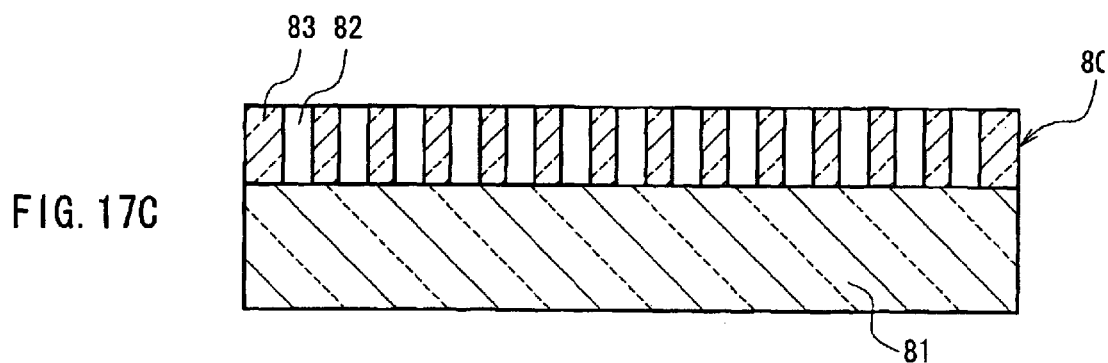

FIG. 17 shows a cross-sectional view of a photonic crystal in the thickness direction. If the photonic crystal is employed as an optical device, then there are various possibilities, including the configuration shown in FIG. 17A, in which no substrate is used and there is only the photonic crystal 80, made of a background material 83 and a rod-shaped material 82, in this case air; the configuration shown in FIG. 17B, where a photonic crystal 80 is formed on a substrate 81 and the rod-shaped material 82, in this case air, is provided up to an intermediate location in the thickness direction of the substrate 81; and the configuration shown in FIG. 17C, where the photonic crystal 80 is formed on the substrate 81.

As the difference in refractive index between the photonic crystal 80 and the material sandwiching the photonic crystal 80 from the top and bottom increases, the light confinement effect is increased. For example, in the case illustrated in FIG. 17A, the photonic crystal is sandwiched above and below by air, and because air has a low refractive index, the confinement effect is high. However, the photonic crystal 80 is thin, having a thickness $d_4$ of 0.2 to 10 μm, for example, and thus bends if not otherwise supported, making it difficult for the photonic crystal 80 alone to be used as an optical device. Accordingly, in general, a photonic crystal is formed on the substrate 81, as shown in FIGS. 17B and 17C, when employed as an optical device.

Also, the configuration shown in FIG. 17C, where the photonic crystal 80 is formed on the substrate 81, is the ideal configuration, however, in practice, the photonic crystal 80 is formed by first providing the background material 83 on the substrate 81 and then providing through holes in the spots where the rod-shaped material 82 will be arranged. Thus holes also are formed in the substrate 81.

By changing the refractive index distribution in the thickness direction of the photonic crystal in addition to changing the refractive index of the material(s) that sandwich(es) the photonic crystal 80 from above and below, the light-confinement effect is increased, and the distribution in the thickness direction of the photonic crystal of the light propagated through the photonic crystal can be controlled.

Figure 18A:
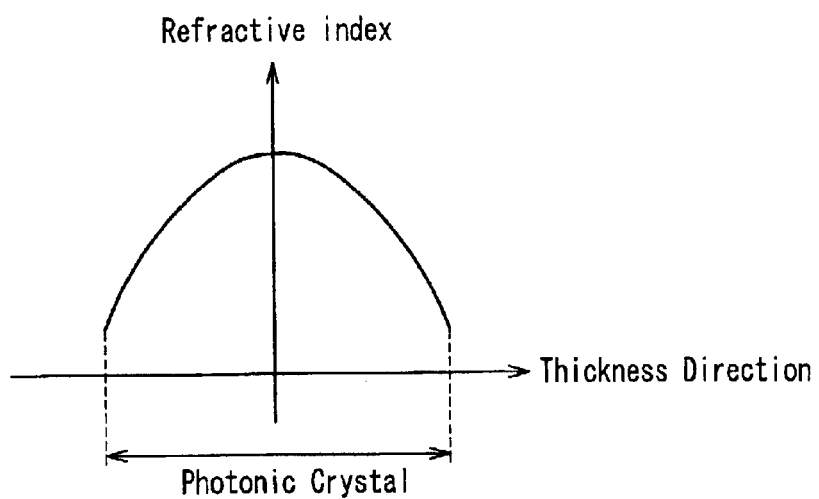
FIGS. 18a–b are diagrams of the refractive index distribution of the photonic crystal of the optical device according to the thirteenth embodiment of the invention.

For example, the refractive index distribution in the thickness direction of the photonic crystal 80 can be set to the photonic crystal refractive index distribution shown in FIG. 18A. That is, the maximum refractive index is located near the center in the thickness direction of the photonic crystal, and the refractive index becomes symmetrically smaller with increased distance from the maximum point. Thus, the effect of light-confinement in the thickness direction of the photonic crystal 80 is increased compared to a case in which the refractive index is uniform. Because light is focused and propagated at the point of maximum refractive index, the spot where the light is focused can be controlled by controlling the position of the point of maximum refractive index.

Figure 18B:
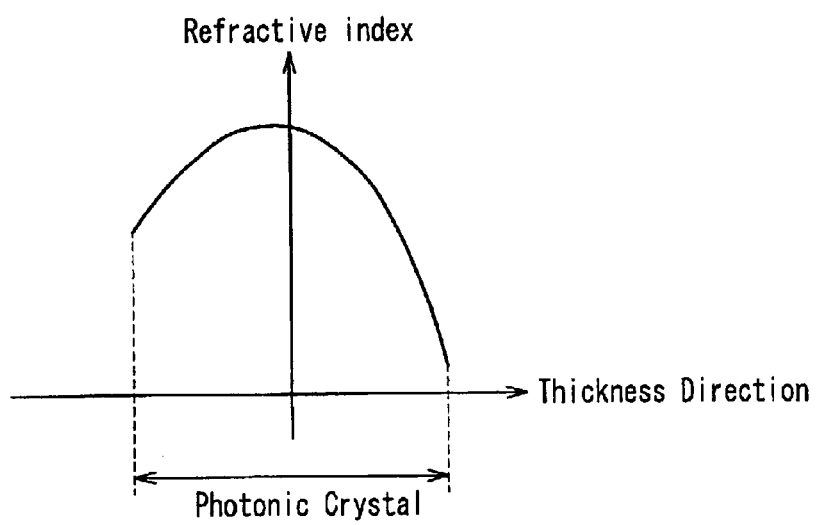

In a case where a substrate is provided below the photonic crystal as in FIGS. 17B and 17C, if the refractive index distribution of the photonic crystal is uniform, then the refractive indices above and below the photonic crystal are different, and thus light is not focused at the center of the photonic crystal but rather is focused toward the substrate 81. For this reason, if the refractive index distribution in the thickness direction of the photonic crystal is set to the refractive index distribution shown in FIG. 18B, for example, in which the maximum point of the refractive index is located near the center in the thickness direction and the refractive index becomes smaller asymmetrically with increasing distance from the maximum point toward the substrate, with a large drop in the refractive index on the substrate 81 side, then light can be focused to the center and moreover the light-confinement effect can be increased.

As illustrated above, adjusting the refractive index distribution of the photonic crystal allows the light that is propagated through the photonic crystal to be set to a desired distribution.

It should be noted that there are different methods for providing a refractive index distribution in the thickness direction of the photonic crystal. For example in a first method, ions are implanted into the background material 83 to change the refractive index of the background material 83 and obtain a desired refractive index distribution. In a second method, materials with different refractive indices are laminated in accordance with the desired refractive index distribution to achieve a multilayer background material 83. Also, the refractive index distribution of the rod-shaped material 82 can be adjusted in the same way as the background material 83 if the rod-shaped material 82 is not air, for example.

Fourteenth Embodiment

Figure 19A:
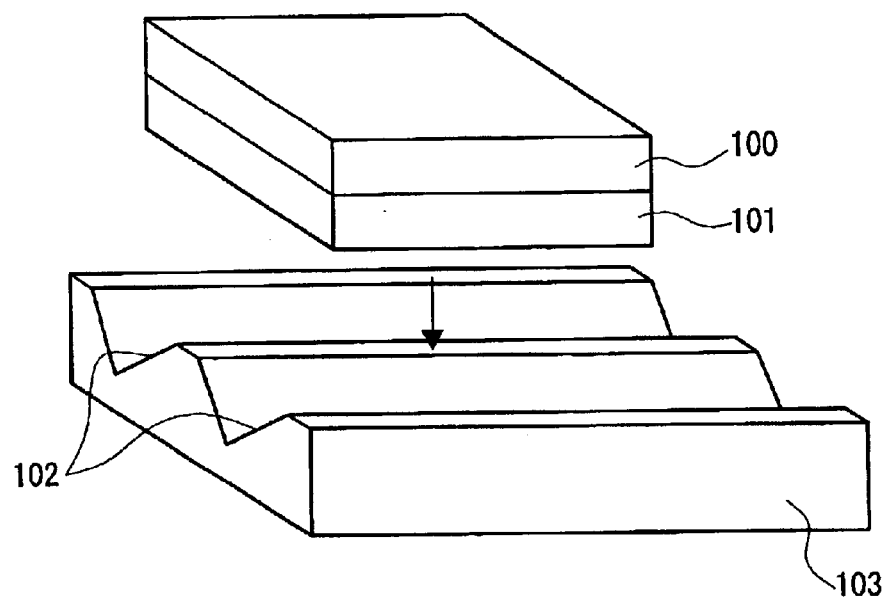
FIGS. 19a–c are diagrams illustrating the fabrication of the photonic crystal of the optical device according to the fourteenth embodiment of the invention.
Figure 19B:
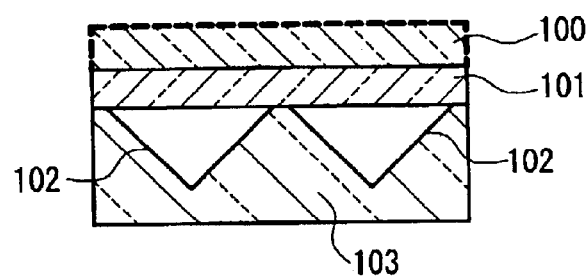

An optical device and method for manufacturing the same according to a fourteenth embodiment of the invention are described with reference to the drawings. As shown in FIG. 19A, first a slab-type photonic crystal 101 is formed on a substrate 100 used for fabrication. More specifically, a background material is formed on the substrate 100 and through holes, in which the rod-shaped material will be provided, are formed therein. To create the through holes, holes are formed in the substrate 100 as well (see FIG. 17), however, this is acceptable because the substrate 100 will be removed anyway. A substrate 103 is provided on the photonic crystal 101 thus formed, serving as an optical device substrate in which a plurality of V-grooves 102 for positioning the optical fiber have been formed. As shown in FIG. 19B, the substrate 100 is removed after the photonic crystal 101 has been joined to the substrate 103. Thus, by fabricating the photonic crystal 101 on the substrate 100, through holes and the like can be formed easily in the photonic crystal. Also, absolutely no damage is incurred by the optical device substrate 103.

Figure 19C:
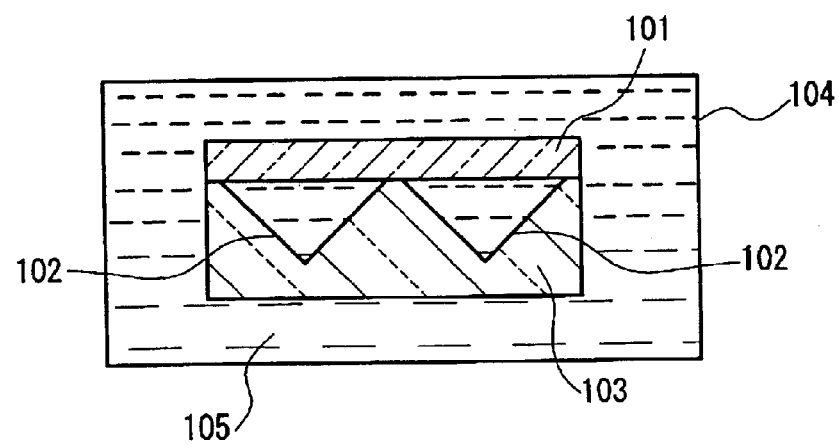

The substrate 103 and the photonic crystal 101, which have been formed into a single unit, are accommodated in a sealed container 104, and as shown in FIG. 19C, a filler material 105 such as a gas or a liquid is filled into the hermetic container 104. By doing this, most of the photonic crystal 101 is surrounded by the filler material 105, as opposed to the substrate 103 being in contact with the entire surface of the photonic crystal 101. Thus, by using a filler material 105 that has a low refractive index, such as air, the refractive index difference in the thickness direction can be made larger and the confinement of light in the thickness direction can be increased. Also, the photonic crystal 101 and the optical fiber can be aligned using the V-grooves 102 formed in the substrate 103.

Figure 20A:
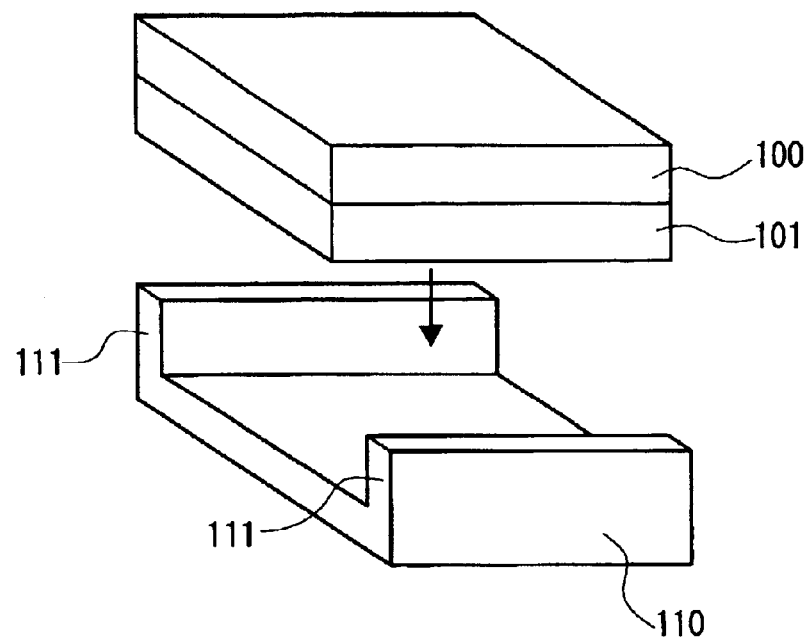
FIGS. 20a–c are diagrams illustrating a separate fabrication of the photonic crystal of the optical device according to the fourteenth embodiment of the invention.
Figure 20B:
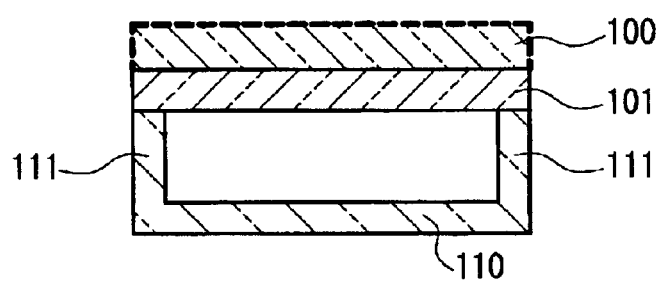
Figure 20C:
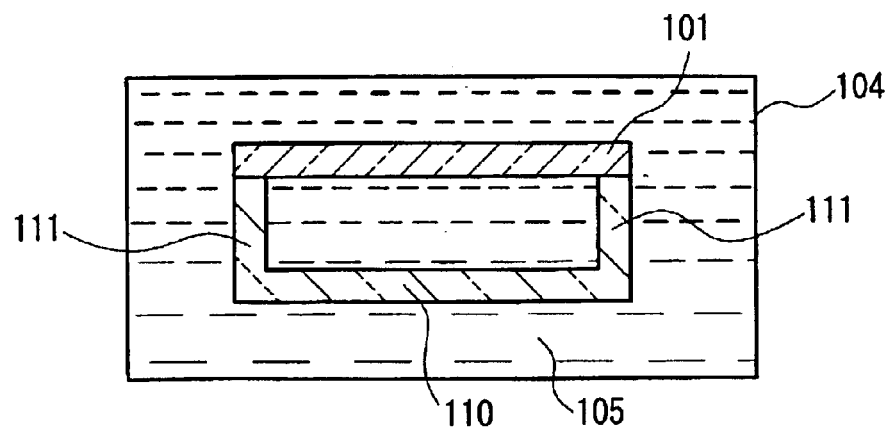
Figure 21:
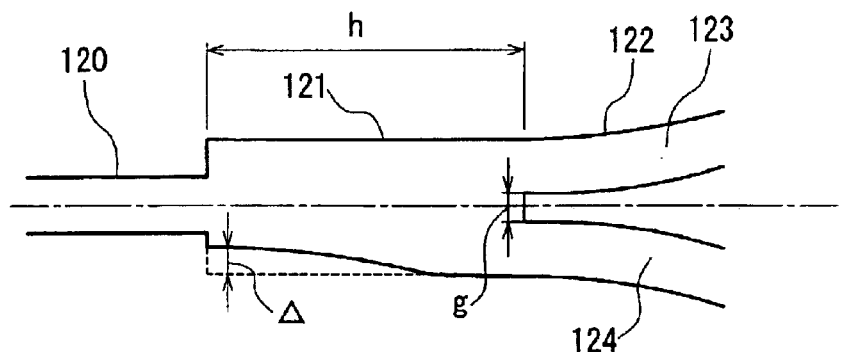
FIG. 21 is a plan view showing the configuration of a conventional optical splitter.
Figure 22:
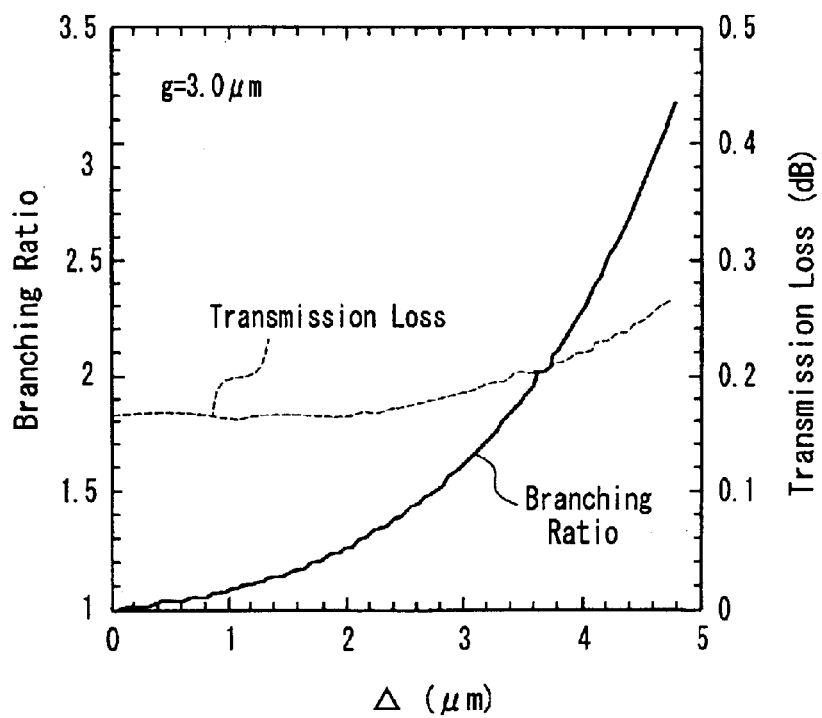
FIG. 22 is a diagram showing the relationship between the branching ratio and the transmission loss of the conventional optical splitter.
Figure 23:
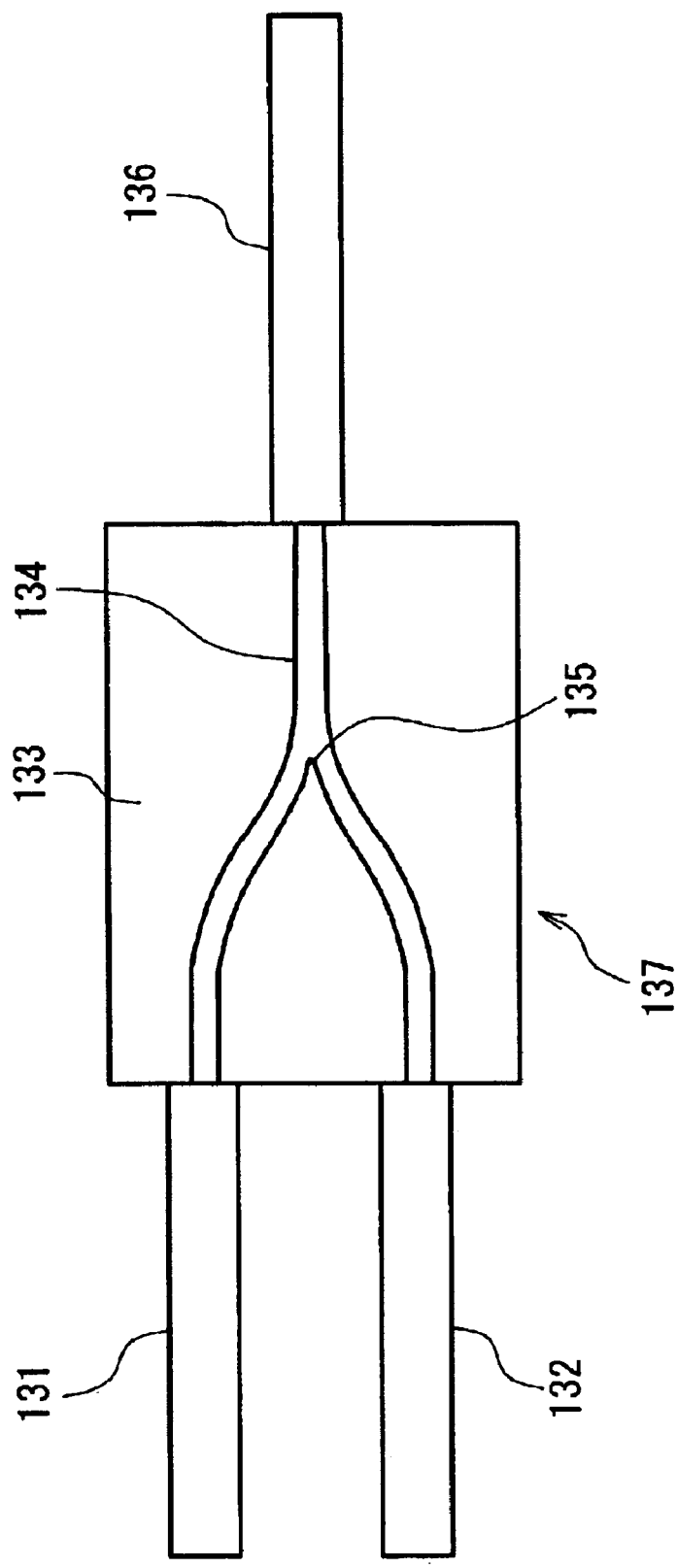
FIG. 23 is a plan view showing the configuration of a conventional optical coupler.

A bracket-shaped substrate 110 having a groove, as shown in FIG. 20, can be used in place of the substrate 103 with V-grooves, and can be processed using the same procedure shown in FIG. 19. The photonic crystal 101 is supported only by the protruding portions 111 at the end portions of the bracket-shaped substrate 110, and thus is supported at positions that do not affect the propagation of light through the photonic crystal 101. Thus, the areas of the photonic crystal 101 that affect the propagation of light are in contact with the filler material 105. The filler material 105 can be a material that has a lower refractive index than the bracket-shaped substrate 110, so that the refractive index difference in the thickness direction of the photonic crystal 101 can be made larger and the confinement of light in the thickness direction can be increased.

The materials and configurations indicated in the first through fourteenth embodiments described above illustrate only some possibilities, and there are no limitations to these.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical device comprising:
   a photonic crystal having a periodic refractive index distribution due to a periodic arrangement of a plurality of materials of different refractive indices;
   an input-side optical waveguide for coupling light into the photonic crystal;
   an output-side optical waveguide for emitting light from the photonic crystal; and
   an external drive portion for changing a relative position of the photonic crystal and at least one of the input-side optical waveguide and the output-side optical waveguide;
   wherein the photonic crystal has a two-dimensional or a three-dimensional lattice structure in which a plurality of materials with different refractive indices are arranged periodically;
   one or more two-dimensional lattice structures composed of a group of primitive lattice vectors are present in the photonic crystal; and
   each of the two-dimensional lattice structures composed of a group of primitive lattice vectors has a lattice structure having no rotation axis of more than three-fold.

2. The optical device according to claim 1, wherein the photonic crystal is a composite photonic crystal in which two photonic crystals having refractive index distributions of different periods are joined at a junction face.

3. The optical device according to claim 2, wherein respective directions of at least one primitive lattice vector of each of the two different photonic crystals with respect to the junction face are identical, and are parallel to the junction face of the photonic crystal, and
   a direction of an optical axis of the input-side optical waveguide is identical to the direction of the at least one primitive lattice vector.

4. The optical device according to claim 3, wherein of the primitive lattice vectors of each photonic crystal, the primitive lattice vectors that are not parallel to the junction face are symmetrical with respect to the junction face.

5. The optical device according to claim 2, wherein:
   there is one input-side optical waveguide;
   there are two output-side optical waveguides;
   the input-side optical waveguide is arranged at an end face of the composite photonic crystal so that its optical axis is near the junction face of the composite photonic crystal;
   the output-side optical waveguides are arranged at a face of the composite photonic crystal on the side opposite that on which the input-side optical waveguide is arranged, and are positioned symmetrically to one another with respect to the junction face; and
   due to a shift amount between the junction face and the optical axis of the input-side optical waveguide that is generated by the external drive portion, light that is incident from the input-side optical waveguide can be branched to a desired branching ratio and emitted to each output-side optical waveguide.

6. The optical device according to claim 5, wherein the external drive portion is capable of shifting the composite photonic crystal or the input-side optical waveguide perpendicularly to the junction face.

7. The optical device according to claim 5, further comprising:
   a monitor portion for monitoring the light amount propagated through each output-side optical waveguide and converting this amount into a signal; and
   a calculation control portion for receiving the signal indicating the light amount from the monitor portion, comparing by calculation this with the desired branching ratio at which light is to be propagated by each output-side optical waveguide, and controlling the external drive portion so that the amount of light propagated through each output-side optical waveguide assumes the desired branching ratio.

8. The optical device according to claim 2, wherein:

there are two input-side optical waveguides;

there is one output-side optical waveguide;

the output-side optical waveguide is arranged at an end face of the composite photonic crystal so that its optical axis is near the junction face of the composite photonic crystal;

the input-side optical waveguides are arranged at a face of the composite photonic crystal on the side opposite that on which the input-side optical waveguide is arranged, and are positioned symmetrical to one another with respect to the junction face; and due to a shift amount between the junction face and the optical axis of the output-side optical waveguide, light that is incident from each input-side optical waveguide can be coupled at each desired coupling ratio and emitted to the output-side optical waveguide.

9. The optical device according to claim 8, wherein the external drive portion is capable of shifting the composite photonic crystal or the output-side optical waveguide perpendicularly with respect to the junction face.

10. The optical device according to claim 8, further comprising:

a monitor portion for monitoring a light amount propagated through the output-side optical waveguide and converting this amount into a signal; and a calculation control portion for receiving the signal indicating the light amount from the monitor portion, comparing by calculation the light amount that is propagated through the output-side optical waveguide and the light amount according to the desired coupling ratio, and controlling the external drive portion so that the amount of light propagated through the output-side optical waveguide becomes a desired value.

11. The optical device according to claim 2, wherein the input-side optical waveguide can be employed as the output side and the output-side optical waveguide can be employed as the input side, and the external drive portion detects the input and output directions of the light and is capable of controlling a shift amount between the junction face and the optical axis of the input-side optical waveguide or the output-side optical waveguide so that it becomes an optimal amount.

12. The optical device according to claim 1, wherein the photonic crystal comprises a background material and a rod-shaped material of different refractive indices, and has a two-dimensional lattice structure in which a plurality of units of the rod-shaped material are arranged periodically in the background material so that their axes are parallel; and acute angles between primitive lattice vectors of the photonic crystal are greater than 60° but smaller than 90°.

13. The optical device according to claim 12, wherein a lattice constant of the photonic crystal is 0.4 to 0.6 times a wavelength of a specific light diverted within the photonic crystal.

14. The optical device according to claim 12, wherein a cross section shape of the rod-shaped material is circular, and the length of a radius of the circular shape is 0.08 to 0.3 times the wavelength of the specific light that is diverted.

15. The optical device according to claim 1, further comprising:

a monitor portion for monitoring a light amount propagated through the output-side optical waveguide and converting this amount into a signal; and a calculation control portion for receiving the signal indicating the light amount from the monitor portion and carrying out calculations based on the light amount to control the external drive portion so that the light amount propagated through the output-side optical waveguide becomes a desired value.

16. The optical device according to claim 1, wherein:

there are two input-side optical waveguides;

there is one output-side optical waveguide;

the input-side optical waveguides are arranged at an end face of the photonic crystal so that their respective optical axes are parallel to a direction of one of the primitive lattice vectors of the photonic crystal;

the output-side optical waveguide is arranged at a face of the photonic crystal on the side opposite that on which the input-side optical waveguides are arranged, so that its optical axis is identical to that of either one of the input-side optical waveguides; and the external drive portion shifts the input-side optical waveguide with the optical axis that is different from the optical axis of the output-side optical waveguide perpendicularly with respect to the optical axis of the output-side optical waveguide.

17. The optical device according to claim 16, wherein a distance between the input-side optical waveguides is substantially proportional to a length of the photonic crystal in a progress direction of light in the photonic crystal.

18. The optical device according to claim 16, wherein a plurality of light beams are propagated through the input-side optical waveguide that has an optical axis identical to the optical axis of the output-side optical waveguide, and only a specific light diverted inside the photonic crystal is propagated into the other input-side optical waveguide.

19. The optical device according to claim 16, further comprising:

a monitor portion for monitoring a light amount propagated through the output-side optical waveguide and converting this amount into a signal; and a calculation control portion for receiving the signal indicating the light amount from the monitor portion, performing a calculation based on a desired light coupling ratio and the light amount, comparing by calculation the light amount that is propagated through the output-side optical waveguide and the light amount according to the desired coupling ratio, and controlling the external drive portion so that the amount of light propagated through the output-side optical waveguide becomes the desired value.

20. The optical device according to claim 1, wherein:

there are two input-side optical waveguides;

there is one output-side optical waveguide;

the input-side optical waveguides are arranged at an end face of the photonic crystal so that their respective optical axes are parallel to a direction of one of the primitive lattice vectors of the photonic crystal;

the output-side optical waveguide is arranged at a face of the photonic crystal on the side opposite that on which the input-side optical waveguides are arranged, so that its optical axis is parallel to and near that of either one of the input-side optical waveguides; and the external drive portion shifts the input-side optical waveguide having an optical axis arranged near the optical axis of the output-side optical waveguide perpendicularly to the optical axis of the output-side optical waveguide.

21. The optical device according to claim 20, wherein a distance between the input-side optical waveguides is substantially proportional to a length of the photonic crystal in a progress direction of light in the photonic crystal.

22. The optical device according to claim 20, wherein a plurality of light beams are propagated through the input-side optical waveguide with the optical axis near the optical axis of the output-side optical waveguide, and only a specific light that is diverted inside the photonic crystal is propagated into the other input-side optical waveguide.

23. The optical device according to claim 20, further comprising:

a monitor portion for monitoring a light amount propagated through the output-side optical waveguide and converting this amount into a signal; and a calculation control portion for receiving the signal indicating the light amount from the monitor portion, performing a calculation based on a desired light coupling ratio and the light amount, comparing by calculation the light amount that is propagated through the output-side optical waveguide and the light amount according to the desired coupling ratio, and controlling the external drive portion so that the amount of light propagated through the output-side optical waveguide becomes the desired value.

* * * * *